US008311353B2

(12) United States Patent
Strom et al.

(10) Patent No.: US 8,311,353 B2
(45) Date of Patent: Nov. 13, 2012

(54) PREDICTION-BASED IMAGE PROCESSING

(75) Inventors: Jacob Strom, Stockholm (SE); Per Wennersten, Arsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 195 days.

(21) Appl. No.: 12/863,762

(22) PCT Filed: May 6, 2008

(86) PCT No.: PCT/EP2008/055519
§ 371 (c)(1),
(2), (4) Date: Jul. 20, 2010

(87) PCT Pub. No.: WO2009/092454
PCT Pub. Date: Jul. 30, 2009

(65) Prior Publication Data
US 2010/0296746 A1    Nov. 25, 2010

(51) Int. Cl.
*G06K 9/36* (2006.01)
(52) U.S. Cl. ......................... 382/238; 382/232
(58) Field of Classification Search .................. 382/107, 382/232, 233, 238, 239, 251; 345/157, 421, 345/422; 375/240.12, 240.15
See application file for complete search history.

(56) References Cited

U.S. PATENT DOCUMENTS

| 6,104,837 A * | 8/2000 | Walker ........................... 382/239 |
| 6,259,431 B1 * | 7/2001 | Futatsugi et al. ............. 345/157 |
| 6,335,977 B1 * | 1/2002 | Kage .............................. 382/107 |
| 2003/0038803 A1 | 2/2003 | Morein et al. |

OTHER PUBLICATIONS

Hasselgren, J. et al. "Efficient Depth Buffer Compression." Computer Graphics, Vienna Austria, Sep. 3, 2006.
Forchhammer, S. et al. "Document and Image Compression, Chapter 5: Lossless Image Coding." CRC Press, May 26, 2006.
Zhao, A, et al., "Adaptive Coding for Generalized Gaussian Sources In Image Coding", Digital TV & digital video, section 2, p. 8, Article No. 1002-8692 (2006) 07-0007-04, Jul. 31, 2006, pp. 1-8.

* cited by examiner

*Primary Examiner* — Duy M Dang
(74) *Attorney, Agent, or Firm* — Coats & Bennett, P.L.L.C.

(57) ABSTRACT

A pixel block (300) is compressed by selecting a start depth value and a restart depth value based on the multiple depth values of the pixels (310-318) in the block (300). A respective plane representation (430) indicative of which plane of a start or restart depth value plane is determined for the pixels (311-318). These representations (430) are employed for selecting a pixel set comprising at least one other pixel (312, 314-317) in the block (300) for a pixel (318) to be encoded. The depth value(s) of the pixel(s) (312, 314-317) in the set are used for determining a prediction of the depth value of the pixel (318). The depth value and the prediction are employed for calculating a prediction error, which is encoded. The compressed pixel block (400) comprises the encoded prediction errors (460), a start value representation (420), a restart value representation (430) and the plane representations (440).

20 Claims, 11 Drawing Sheets

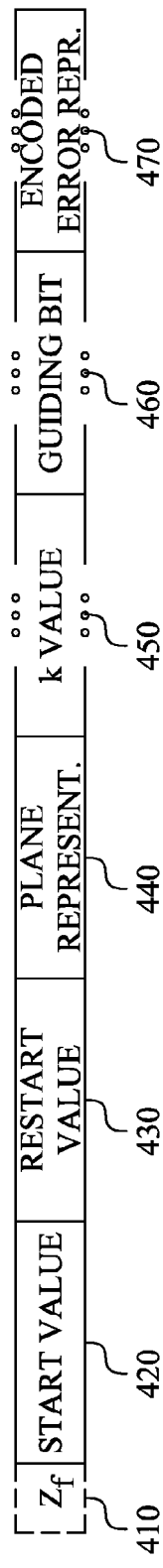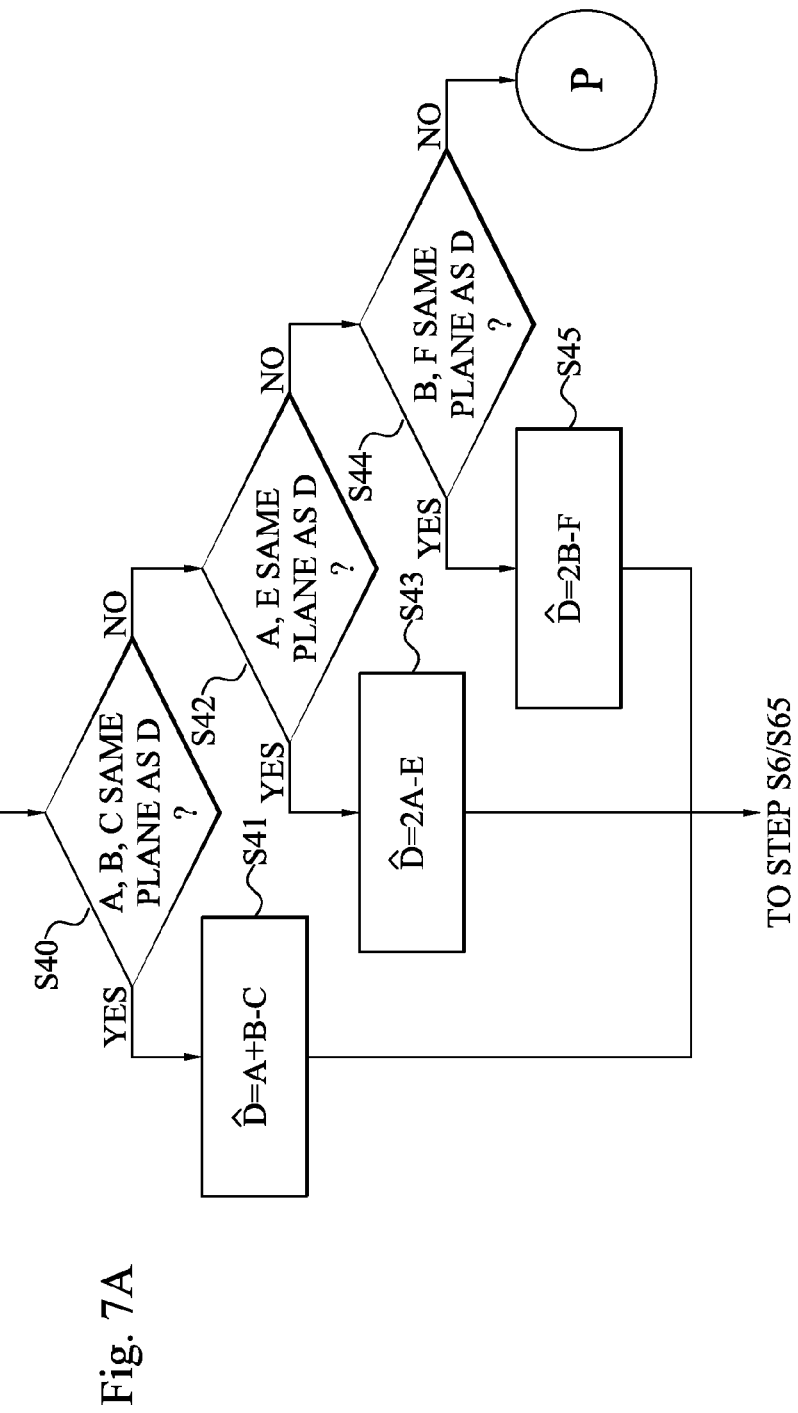
Fig. 7A
Fig. 8

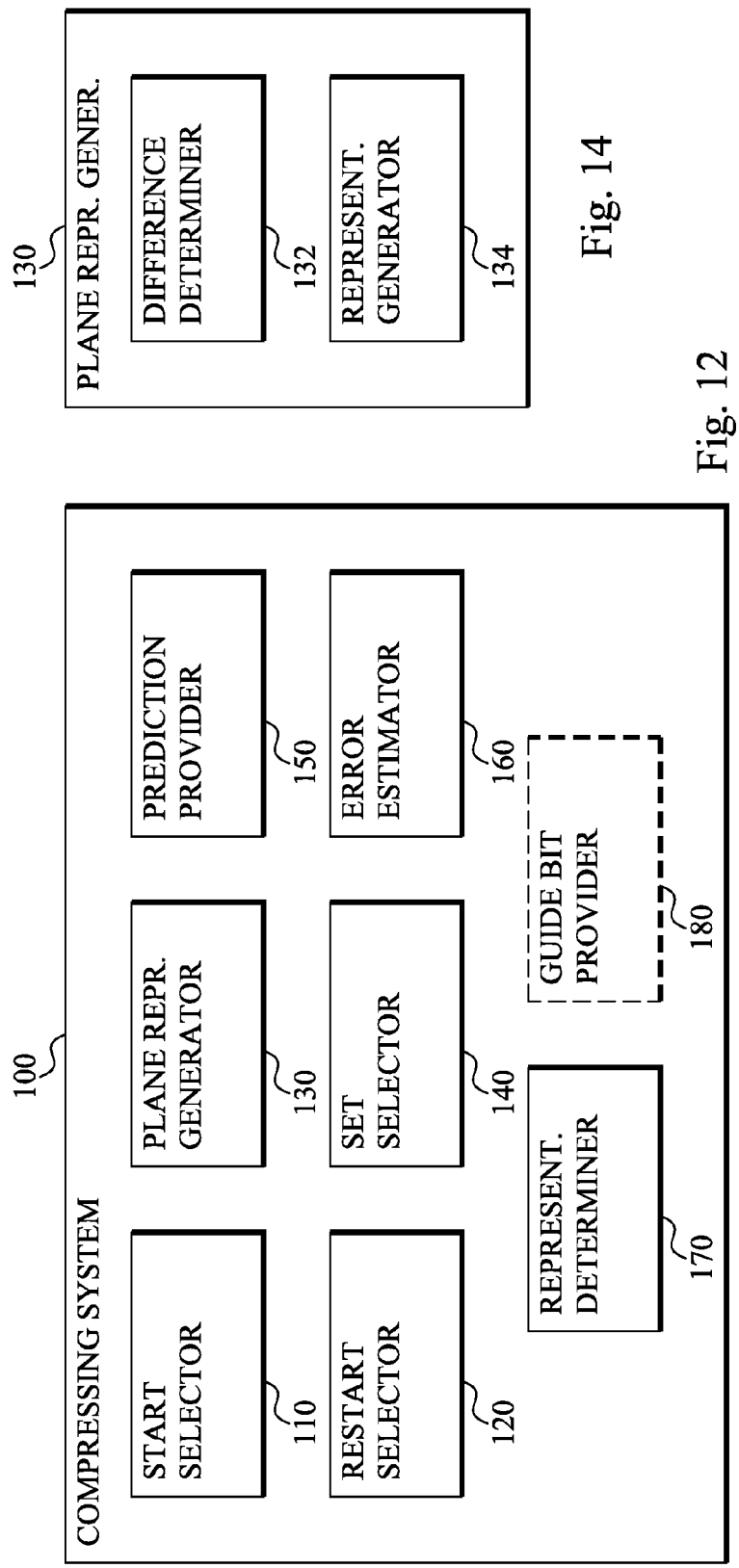
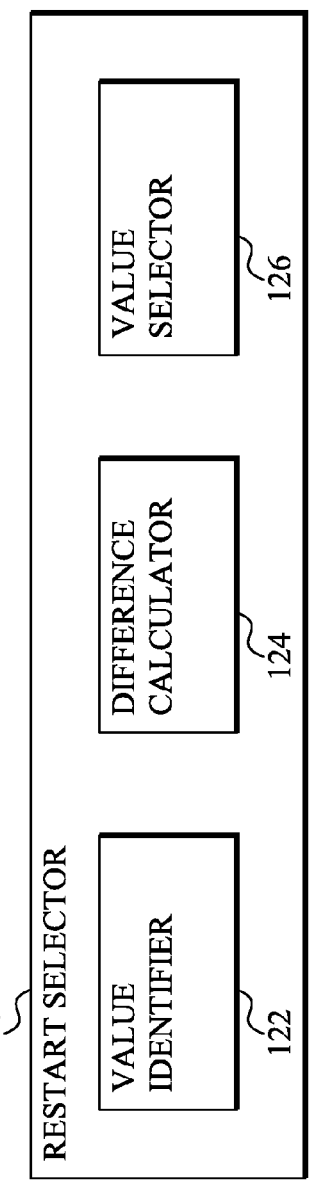
Fig. 14
Fig. 12
Fig. 13

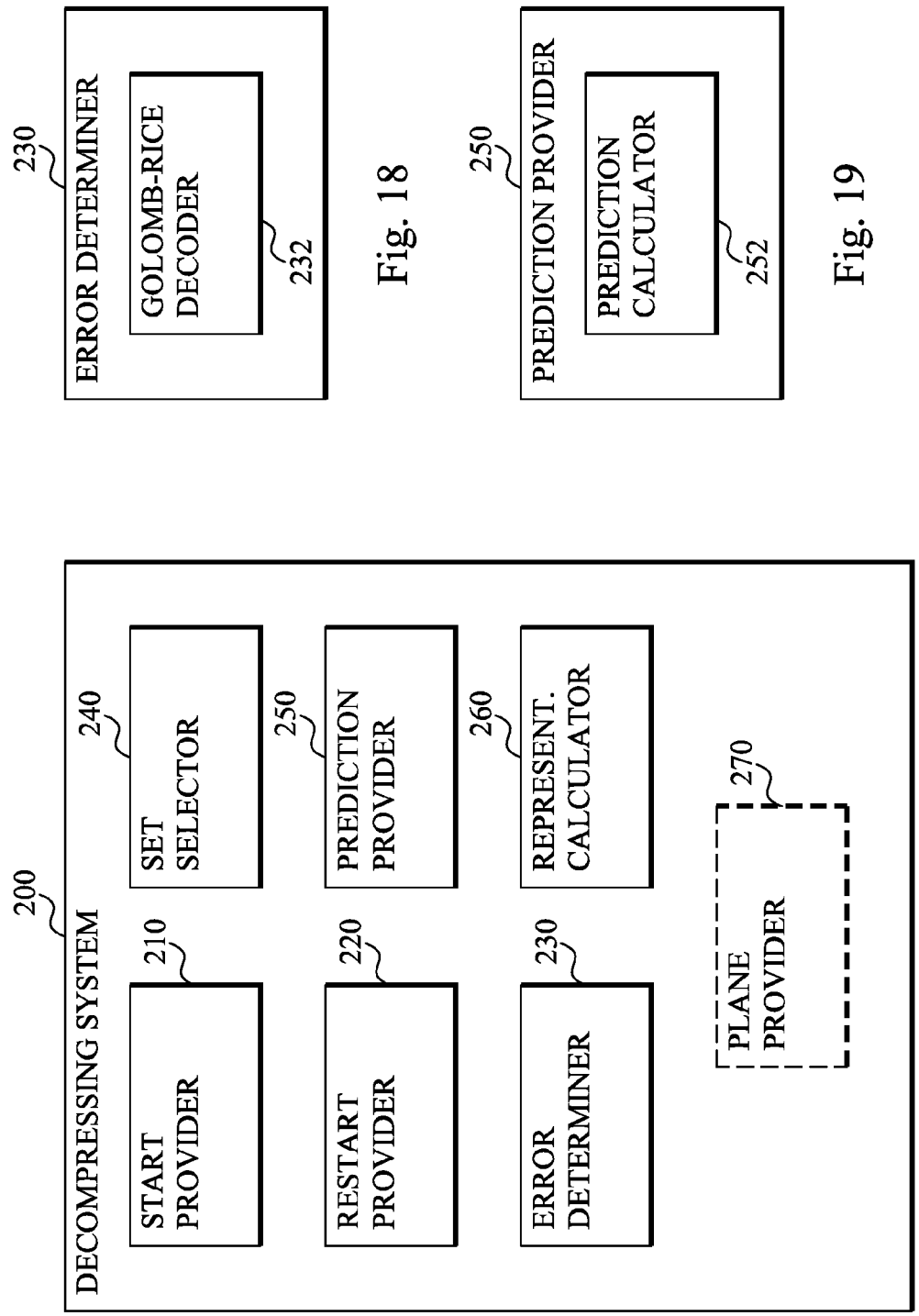

PREDICTION-BASED IMAGE PROCESSING

TECHNICAL FIELD

The present invention generally relates to image processing, and in particular to prediction-based compression and decompression of image blocks.

BACKGROUND

In order to increase performance for graphics processing units (GPUs), memory bandwidth reduction techniques are employed. One such way to decrease the bandwidth requirements is to perform what is called buffer compression. A graphics system typically uses two buffers: a color buffer where the colors of the pixels are drawn and a depth buffer where the depth of each pixel is stored. During rendering these buffers are read and written to and often the same pixel is accessed several times for both buffers. These read and write accesses are expensive in terms of energy and should therefore be kept to a minimum, in particular for user terminals with limited power supply, such as mobile devices.

Buffer compression means that blocks of buffer data is stored in memory in compressed form. Since the decompression and compression might happen several times for a particular pixel and block, it is important that the compression is lossless, i.e. non-destructive.

Document [1] and [2] give good overviews of prior art color buffer compression and depth buffer compression, respectively.

There are still a need for efficient depth buffer compression/decompression algorithms and in particular such algorithms that can be effectively employed for handling pixel blocks having depth buffer values belonging to different depth value planes.

SUMMARY

The present invention overcomes these and other drawbacks of the prior art arrangements.

It is a general object of the present invention to provide an efficient compression and decompression of pixel blocks.

It is another object of the invention to provide a compression and decompression adapted for depth buffer values.

These and other objects are met by the invention as defined by the accompanying patent claims.

Briefly, the present invention involves compression and decompression of blocks of pixels having associated depth buffer values. The compression involves selecting a start depth value for the pixel block, preferably selected as the depth value of a pixel at a predefined position in the block. The start depth value is regarded as included in a start depth value plane. A restart depth value present in a restart depth value plane is selected for the pixel block, preferably selected as the depth value of an identified pixel in the block.

Furthermore, respective plane representations for pixels in the block are generated, where these representations can be regarded as being indicative of which of the start and restart planes the pixels belong to. The plane representations are used for selecting a pixel set comprising, for a pixel to be compressed, at least one other pixel in the block. The set preferably comprises one or multiple previous pixels in one or multiple prediction directions in the block. The depth value(s) of the at least one pixel in the pixel set is (are) employed for determining a prediction of the depth value of the current pixel.

A prediction error is then calculated based on the determined prediction and the depth value of the pixel, preferably as a difference therebetween. The prediction is encoded to get an encoded prediction error. The compressed representation of the pixel block comprises these encoded prediction errors together with representations of the start and restart values and preferably the plane representations.

During decompression a start depth value is provided for the pixel block based on the start value representation included in the compressed block. This start depth value is assigned as depth value of the pixel at predefined position in the block. A restart depth value is correspondingly provided based on information included in the compressed block and is assigned as depth value for a pixel identified in the block.

An encoded prediction error representation associated with a pixel and included in the compressed block is decoded to get the prediction error for the pixel. Plane representations of pixels in the block and preferably included in the compressed block are retrieved and employed for selecting at least one other pixel in the block to constitute a pixel set for the pixel. The prediction for the pixel is determined based on the depth value(s) of the at least one pixel in the pixel set.

The pixel is decoded by calculating its depth value from the determined prediction and the decoded prediction error.

The present invention also relates to a compressing system and a decompressing system.

The present invention prevents predicting depth values over plane boundaries and thereby provides good prediction candidates to the pixels in the block and consequently efficient pixel compression and decompression.

Other advantages offered by the present invention will be appreciated upon reading of the below description of the embodiments of the invention.

SHORT DESCRIPTION OF THE DRAWINGS

The invention together with further objects and advantages thereof, may best be understood by making reference to the following description taken together with the accompanying drawings, in which.

Figure 1:
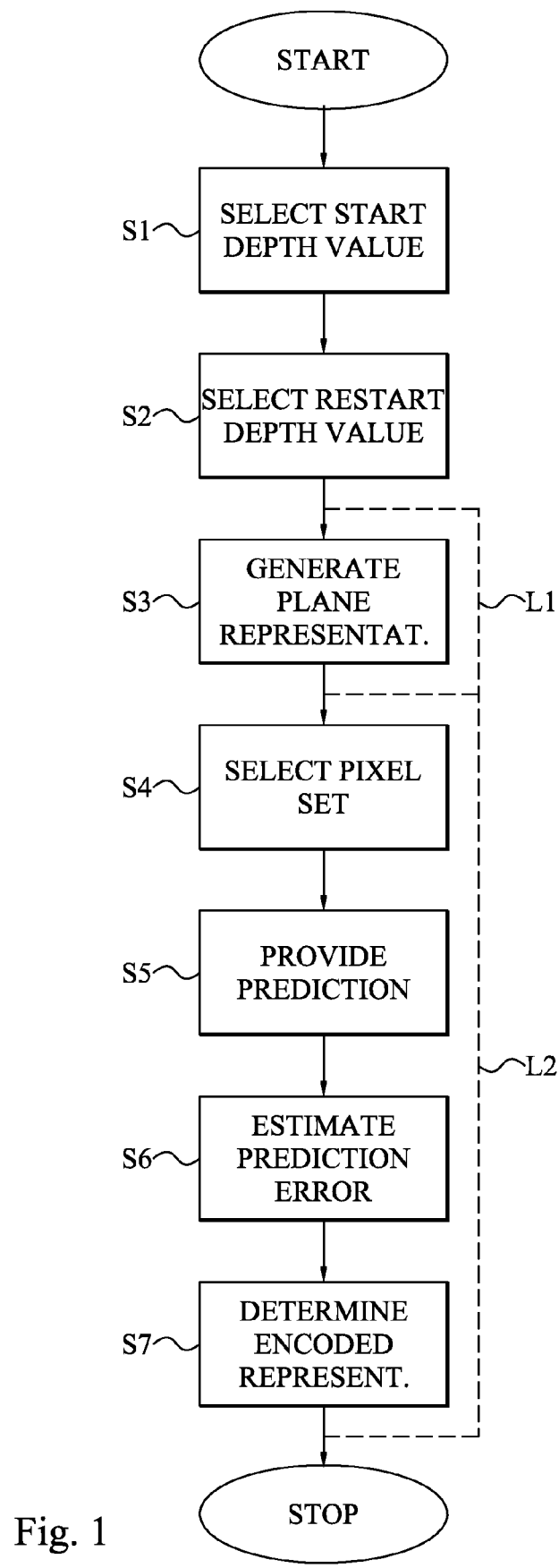
FIG. 1 is a flow diagram of an embodiment of a block compressing method according to the present invention.
Figures 2, 3, 4, 5:
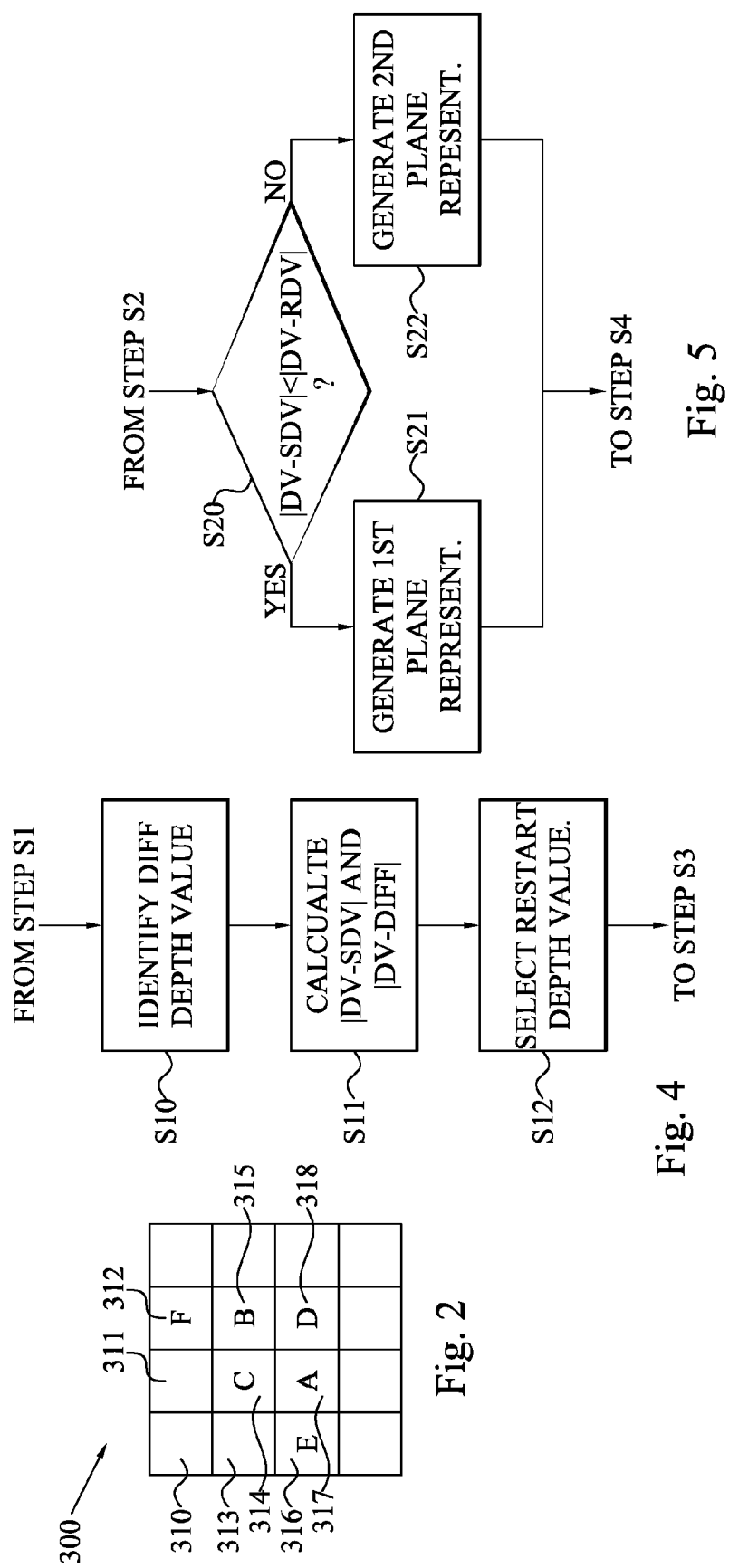
FIG. 2 is an illustration of an example of a pixel block useful in the present invention.
Figure 6:
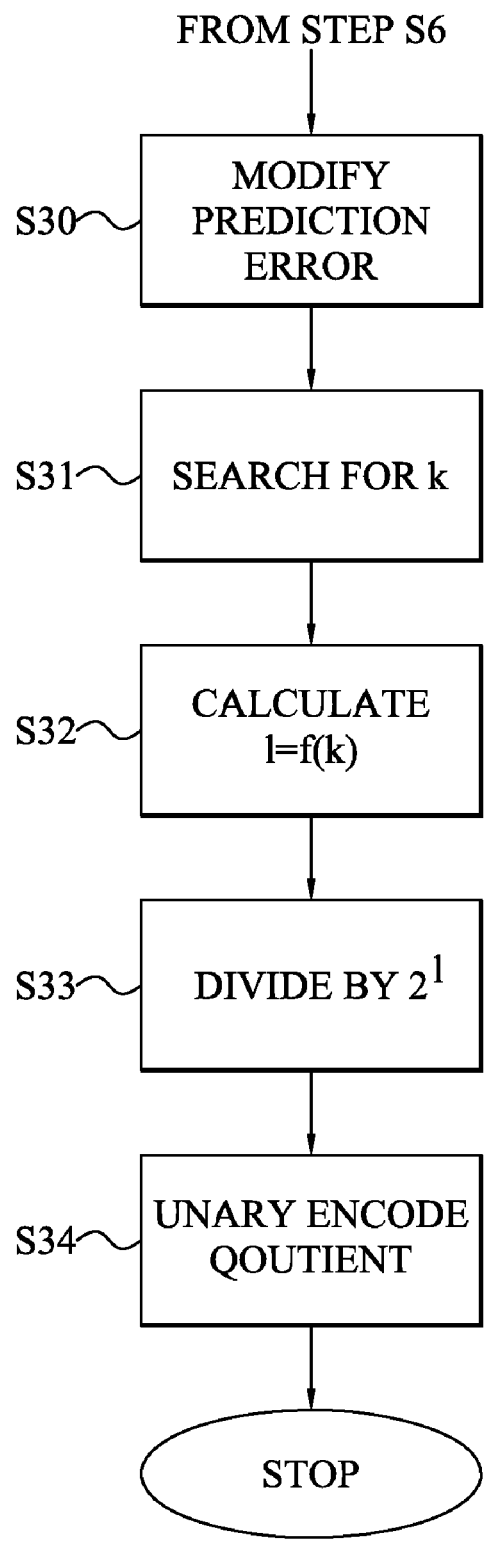
Figure 7B:
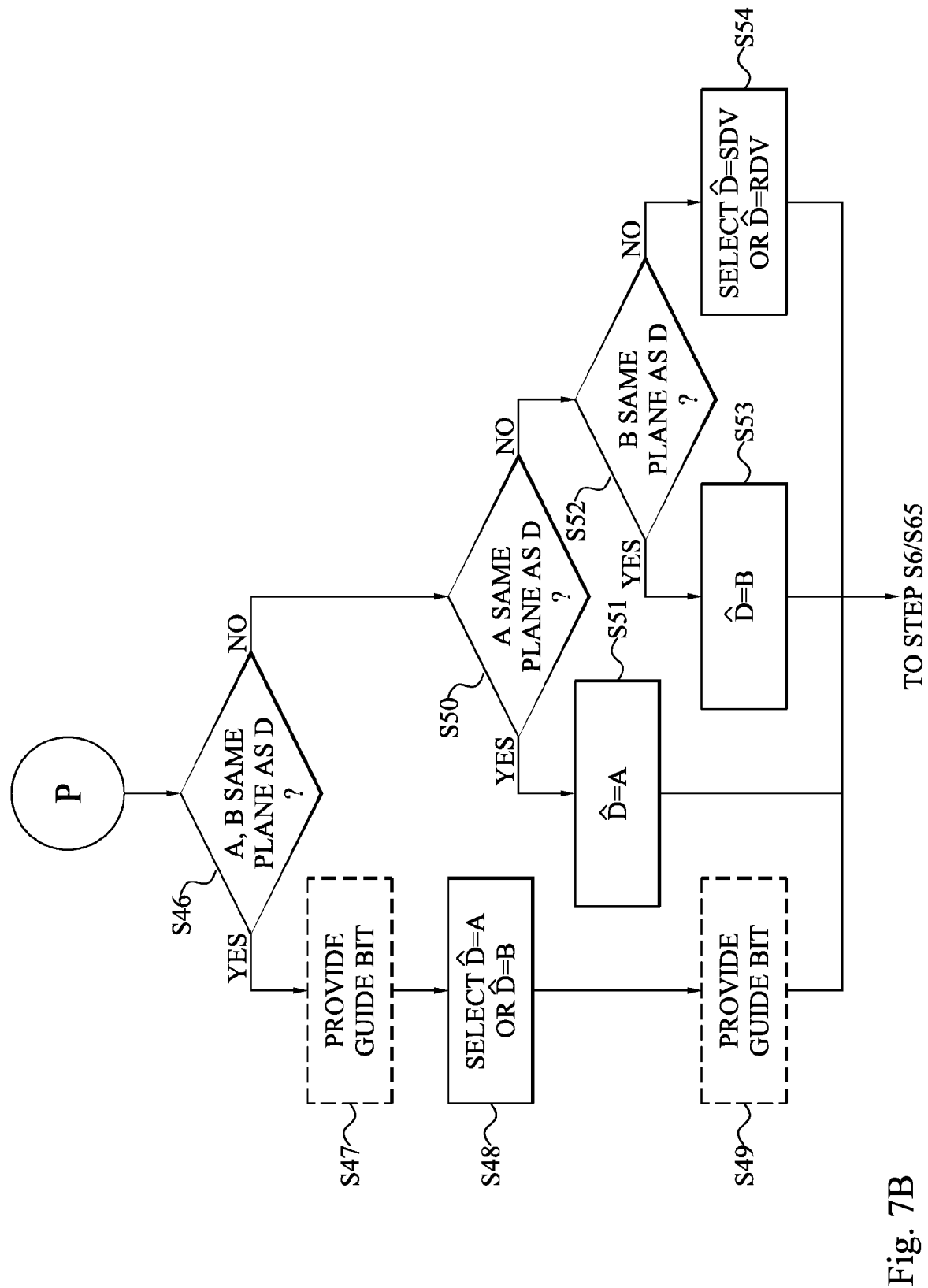
Figures 9, 10:
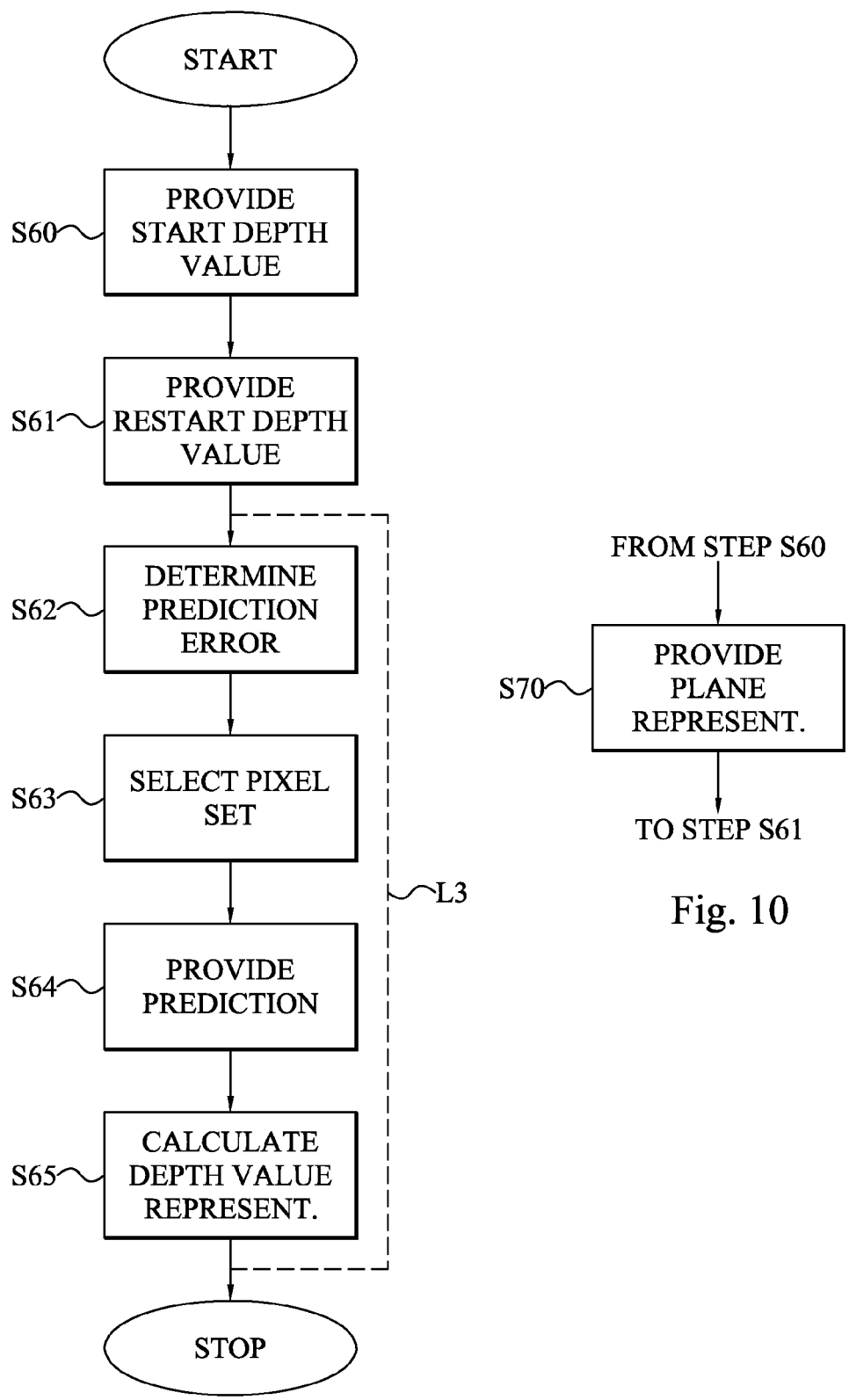
Figure 11:
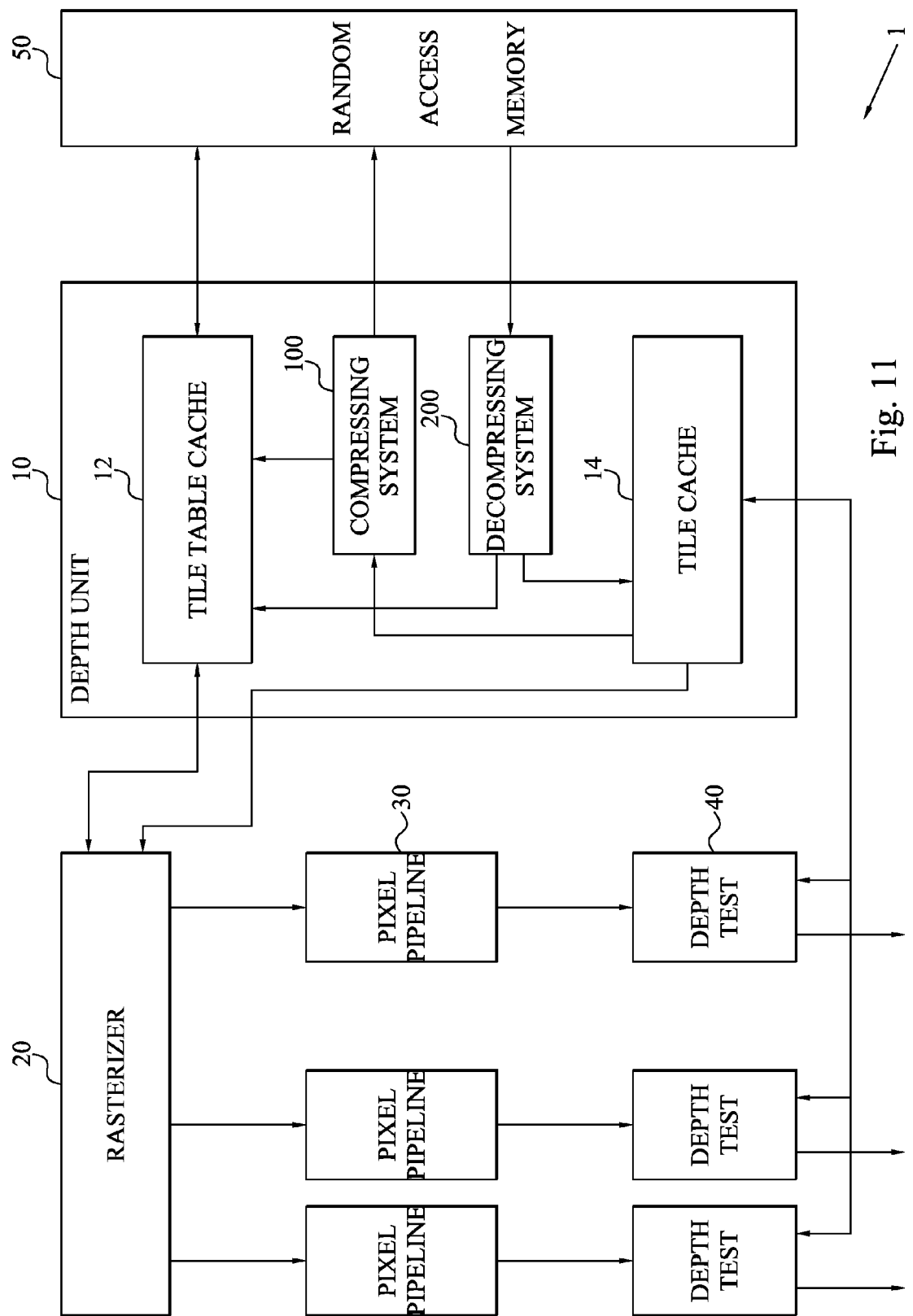
Figure 16:
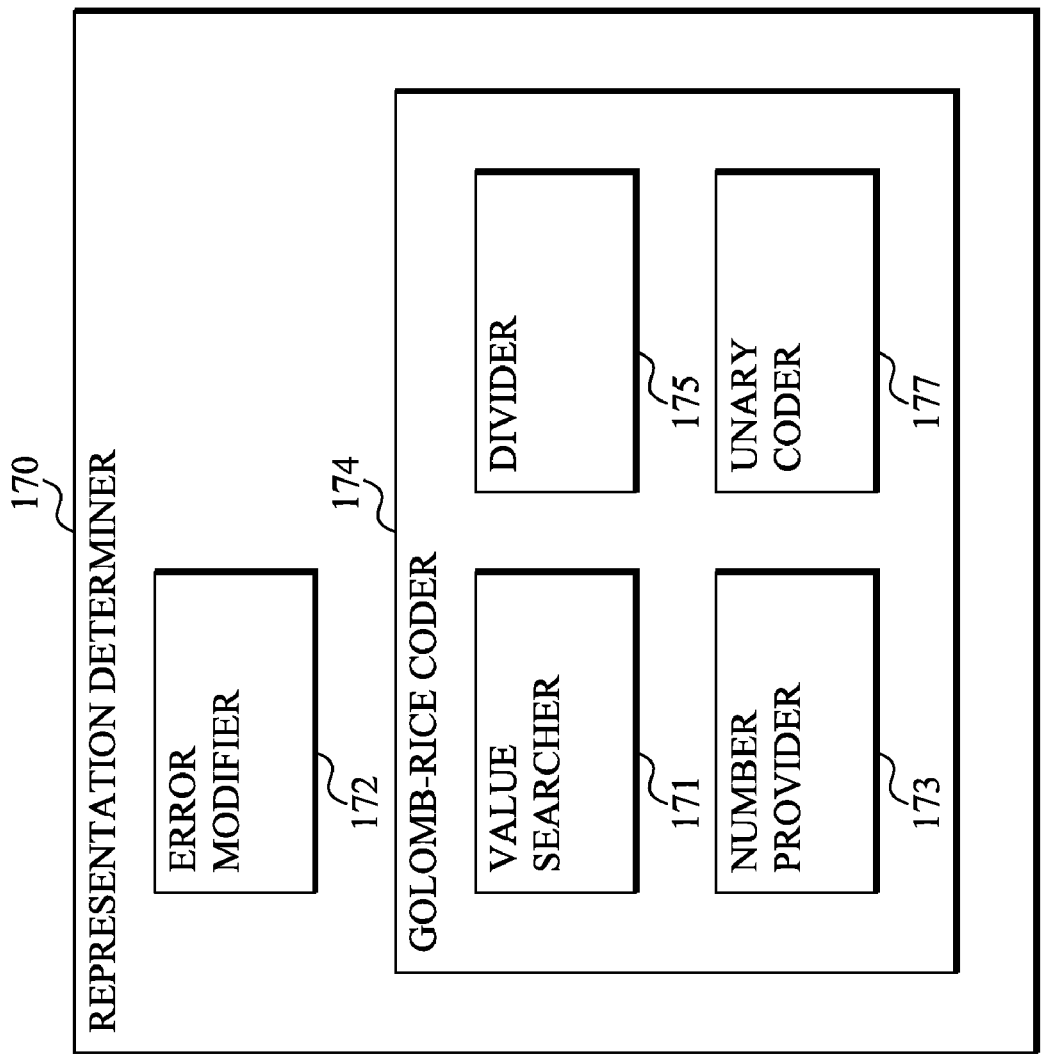
Figure 15:
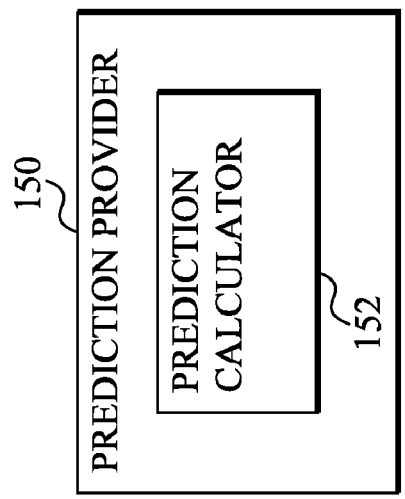
Figure 20:
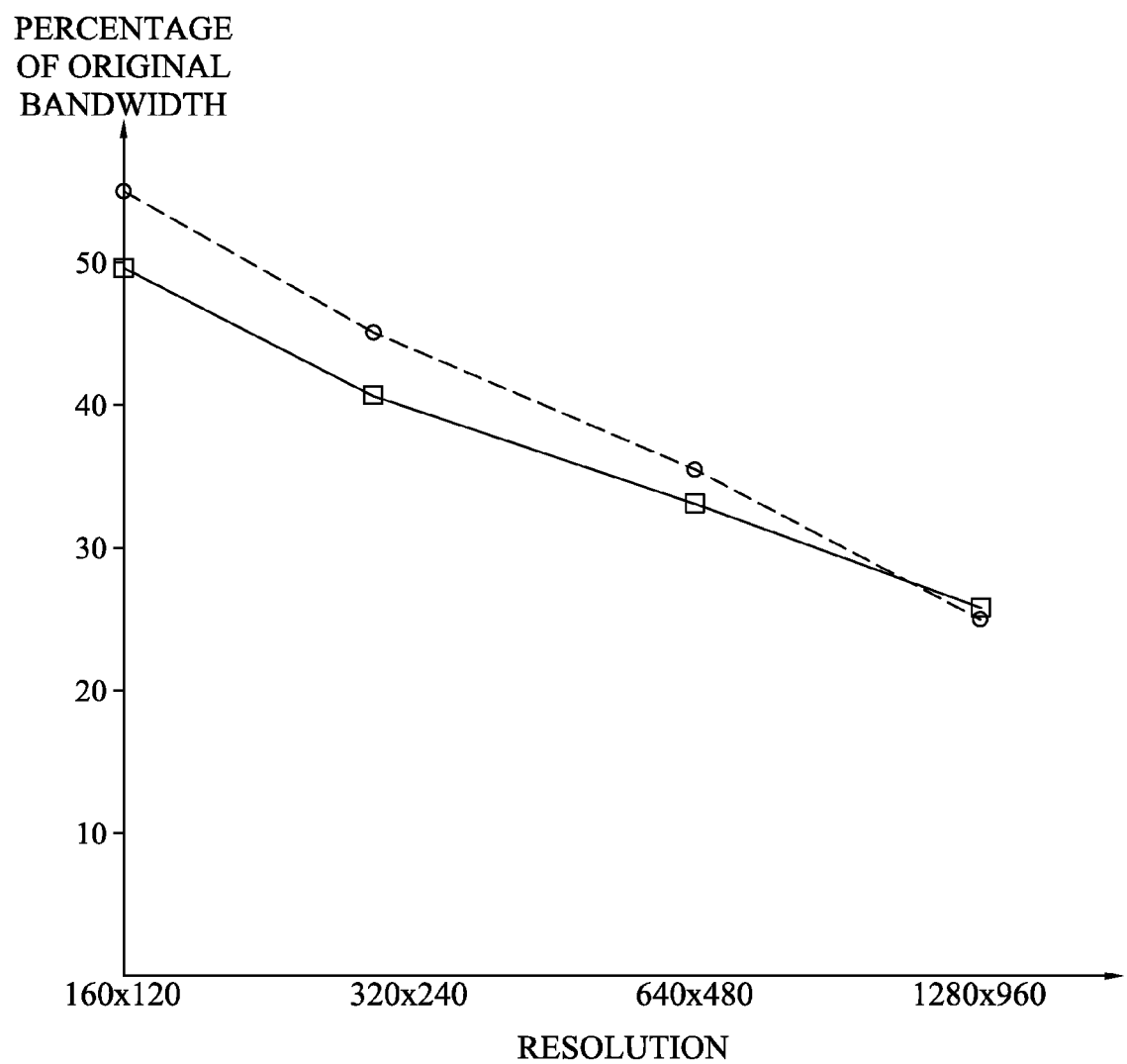

FIG. 3 schematically illustrates usage of integer numbers as representations of floating-point numbers;

FIG. 4 is a flow diagram illustrating additional steps of the compressing method in FIG. 1;

FIG. 5 is a flow diagram illustrating the plane representation generating step according to an embodiment of the present invention;

FIG. 6 is a flow diagram illustrating an embodiment of the step of determining encoded error representation of FIG. 6 in more detail;

FIGS. 7A and 7B are low diagrams illustrating an embodiment of the set selecting and prediction providing steps of FIG. 1 or 9 in more detail;

FIG. 8 is an illustration of an example of compressed representation of a pixel block;

FIG. 9 is a flow diagram of an embodiment of a block decompressing method according to the present invention;

FIG. 10 is a flow diagram illustrating an additional step of the decompressing method of FIG. 9;

FIG. 11 is a schematic block diagram of a depth buffer architecture to which the teachings of the present invention can be applied;

FIG. 12 is a schematic block diagram of a compressing system according to an embodiment of the present invention;

FIG. 13 is a schematic block diagram of the restart selector in FIG. 12 according to an embodiment of the present invention;

FIG. 14 is a schematic block diagram of the plane generator determiner in FIG. 12 according to an embodiment of the present invention;

FIG. 15 is a schematic block diagram of the prediction provider in FIG. 12 according to an embodiment of the present invention;

FIG. 16 is a schematic block diagram of the representation determiner in FIG. 12 according to an embodiment of the present invention;

FIG. 17 is a schematic block diagram of a decompressing system according to an embodiment of the present invention;

FIG. 18 is a schematic block diagram of the error determiner in FIG. 17 according to an embodiment of the present invention;

FIG. 19 is a schematic block diagram of the prediction provider in FIG. 17 according to an embodiment of the present invention; and FIG. 20 is a diagram comparing compression performance of the present invention with a prior art compression scheme.

DETAILED DESCRIPTION

Throughout the drawings, the same reference characters will be used for corresponding or similar elements.

The present invention generally relates to a lossless compression and decompression of pixel parameter values, and in particular such a compression and decompression suitable for depth buffer compression and decompression.

The present invention is well adapted for usage with three-dimensional (3D) graphics, such as games, 3D maps and scenes, 3D messages, e.g. animated messages, screen savers, man-machine interfaces (MMIs), etc., but is not limited thereto. Thus, the invention could also be employed for encoding other types of images or graphics, e.g. one-dimensional (1D), two-dimensional (2D) or 3D images.

In the present invention, the compression and decompression collectively handles a plurality of pixels, typically in the form of a block or a tile of pixels. In a preferred embodiment of the invention, a pixel block has the size of M×N pixels, where M, N are integer numbers with the proviso that both M and N are not simultaneously one. Preferably, $M=2^m$ and $N=2^n$, where m, n are zero or integers with the proviso that m and n are not simultaneously zero. In a typical implementation M=N and preferred such block embodiments could be 4×4 pixels, 8×8 pixels or 16×16 pixels.

The expression pixel or "image element" refers to an element in a block or encoded representation of a block. This block, in turn, corresponds to a portion of an image, texture or buffer. Thus, according to the invention, an image element could be a texel (texture element) of a (1D, 2D, 3D) texture, a pixel of a (1D or 2D) image or a voxel (volume element) of a 3D image. Generally, a pixel is characterized with an associated pixel parameter value or feature. In a preferred embodiment of the present invention, the pixel parameter value is a depth value or so-called Z value. This feature represents the depth or distance to the eye for the particular pixel and controls which pixels that will actually be displayed during rendering.

The compression and decompression is adapted for handling collinear pixel parameter values, i.e. parameter values lying in a plane. Thus, the pixel parameter values of a block to be compressed all lie in a single plane in a parameter space or lie in one of a set of multiple planes, typically two planes. This requirement implies that it may be possible to achieve a lossless compression of the pixel block using fewer bits than the original number bits of the original representation of the pixel parameter values.

Furthermore, in the following, the term "image" is used to denote any 1D, 2D or 3D image or texture that can be encoded and decoded by means of the present invention, including but not limited to bump maps, normal maps, photos, game type textures, text, drawings, high dynamic range images and textures, etc.

Compression

FIG. 1 is a flow diagram illustrating a method of compressing a block of pixels according to the present invention. The method starts in step S1 by selecting a start depth value for the block to be compressed. This start depth value $Z_{start}$ is preferably set equal to the depth value of one of the pixels in the block and preferably a pixel occupying a predefined position in the block. A preferred implementation of such a predefined position is to use the first pixel of the block, i.e. occupying the upper left corner, $Z_{start}=Z_{11}$. Other examples of possible start pixel positions could be any of the other block corners. Actually any predefined position in the block could be used as start position although a corner position, and in particular the upper left corner pixel, significantly simplifies the compression of the block.

The selected start depth value is regarded as belonging to a first depth value plane of the block. A representation of the start value, such as a P-bit start value, if the selected depth value comprises P bits, is included in the compressed representation of the block.

A next step S2 selects a so-called restart depth value for the block. This value is regarded as belonging to a second depth value plane, i.e. a different plane as the start value. The restart depth value $Z_{restart}$ is preferably selected to be equal to the depth value of an identified pixel in the block, i.e. $Z_{restart}=Z_{ij}$, where i,j=1, 2, . . . , N with the proviso that (i,j)≠(1,1) if the pixel at position (1,1) is used for providing the start depth value, and N represents the number of pixels per row and column.

The compressed block comprises a representation of the selected restart value, preferably in the form of a P-bit restart value if the selected depth value comprises P bits.

Step S3 generates a plane representation for a pixel. This plane representation is indicative of, to which plane of the first (start) plane and the second (restart) plane the pixel belongs. The representation is preferably a 1-bit word, where a value of $0_{bin}$ (or $1_{bin}$) indicates the first plane and $1_{bin}$ (or $0_{bin}$) represents the second plane.

Step S3 is preferably performed for at least a portion of the multiple pixels in the block, which is schematically illustrated by the line L1. More preferably, step S3 is performed for each pixel in the block, possibly excluding the start pixel (pixel associated with start depth value). It may optionally be possible to also exclude the restart pixel (pixel associated with the restart depth value). These multiple plane representations can then be regarded as a bit map telling which plane each pixel belongs to. The bit map (plane representations) is preferably included in the compressed block representation.

In an alternative embodiment, the order of the steps S2 and S3 is interchanged. This means that following the selection of start depth value of step S1, plane representations are generated for the remaining pixels in the block. In such a case, the first pixel in traversing order in the block having generated plane representation different from the (start) plane representation associated with the start depth value is regarded as the restart pixel. The depth value of that pixel is then employed as restart depth value for the block.

The following steps S4 to S7 are performed for each pixel to be encoded of the multiple pixels in the block. Step S4 selects a pixel set comprising at least one other pixel in the block for the pixel. The set selection is performed based on the respective plane representations of the current pixel and the pixels in the set. In a preferred implementation, the selected pixel(s) of the set has (have) the same plane representation as the current pixel, i.e. belong(s) to the same plane as the pixel.

The depth value(s) of the pixel(s) in the selected set is (are) used in step S5 for providing a prediction $\hat{Z}_{ij}$ of the depth value $Z_{ij}$ of the current pixel. In other words, the depth value prediction of the pixel is calculated or determined based on the at least one depth value of the pixel set.

A next step S6 estimates a prediction error $\tilde{Z}_{ij}$ of the pixel based on the depth value of the pixel and the prediction provided in step S5. The prediction error is preferably calculated as a difference between the original depth value of the pixel and the prediction, $\tilde{Z}_{ij}=Z_{ij}-\hat{Z}_{ij}$.

An encoded representation of the calculated prediction error is determined in step S7. The compressed or encoded representation of the block then comprises this encoded representation.

The procedure is preferably repeated for multiple pixels in the block, which is schematically illustrated by the line L2. In such a case, the compressed block comprises a respective encoded prediction error representation for each of these pixels (of course except the pixel associated with the start value and the pixel associated with the restart value). The compressed block preferably also comprises the representations of the start depth value, restart depth value and preferably the bit map of plane representations.

FIG. 2 is a schematic illustration of a block 300 of multiple pixels 310-318. As is well-known in the art, original depth value components of pixels in a depth buffer are often 24-bit integers. Lapidous and Jaio [3] present an alternative way to encode depth buffers using floating point values, called "complementary Z representation". Using this representation, it is possible to use fp16, fp24, fp32, etc. The fp16 format used by Lapidous and Jaio has 3 bits of exponent, 13 bits of mantissa and no sign bit. The mathematical value of fp16 is $2^{(exponent-4)} \times (1 \cdot mantissa)$.

The floating-point nature of floating point numbers, however, leads to problems. Since the density of floating-point numbers is not uniform, the difference between two floating-point numbers may not be representable. FIG. 3 illustrates this concept. The upper half of FIG. 3 indicates float representations. The non-uniformity of number density is clearly visible as the density increases ever closer to zero. In order to illustrate the problems of having color component representations in the form of floating-point numbers, assume that a first depth value is 7.5 and a second depth value is 1.875. Both these numbers are representable using fp16. However, the difference between the two numbers 7.5−1.875=5.625 cannot be represented as in fp16. In clear contrast, the closest representation is 5.5. However, as was mentioned in the background section, depth buffer compression needs to be lossless. As a consequence, blocks requiring the calculation of a difference between the above-mentioned floating-point numbers cannot be losslessly compressed as the difference cannot be correctly represented in fp16.

The present invention can solve this problem of floating-point numbers by mapping each floating-point number to a respective integer representation as illustrated in FIG. 3. This basically corresponds to assigning, to each floating-point number, a unique integer number. Thus, the mapping from floating-point to integer domain involves assigning ever higher integer numbers to the ever higher floating-point number. This means that 0.0 will be assigned integer representation 0, the next smallest positive floating-point number is assigned 1, the second next smallest floating-point number is assigned 2 and so on.

The example given above would correspond to adding the difference 16 to the integer number 15 to get the result of 31, or 7.5 if interpreted as a float. A preferred implementation of the present invention, therefore involves interpreting the floating-point depth values as integers according to a one-to-one mapping between the floating-point domain and the integer domain. Doing the calculations and arithmetics in the integer domain also avoids costly floating-point operations. Furthermore, since the compression is lossless, a correct handling of NaN (Not a Number), Inf (Infinity) and denorms (denormal numbers) is also obtained. In such a case, during compression the floating-point numbers are interpreted as integers according to the mapping described above and illustrated in FIG. 3. Following decompression, the integer numbers are then re-interpreted back into floating-point numbers.

The present invention can be used in connection with both integer depth values and floating-point depth values, the latter preferably through the above-discussed one-to-one relationship between integer and floating-point numbers.

The restart pixel position can be identified according to different embodiments. In a first approach, the block is compressed without the usage of any restart value at all. The same block is then compressed once for each possible restart position, i.e. all pixel positions except the previously described start pixel position. In the case of a 4×4 block, this means determining 1+15 different compressed block candidates. If the block compressed without usage of any restart value leads to a smallest compressed size, no restart values are employed for the current block. However, if the compressed block candidate leading to smallest compressed size is one of the 15 candidates using a restart value, the position of the restart pixel is identified to be the one used in the block candidate having smallest compressed size.

An alternative method that is computationally more effective will be described below in connection with FIG. 4, which illustrates an embodiment of the selecting step S2 of FIG. 1. The method continues from step S1 of FIG. 1. A next step S10 identifies the depth value in the block differing the most from the start depth value. Absolute differences to the start value is first calculated for all remaining pixels in the block, $|Z_{start}-Z_{ij}|$ where $(i,j) \neq (1,1)$. The pixel having depth value resulting in the largest absolute difference is identified. This depth value is denoted $Z_{diff}$ herein. Thereafter, a first absolute difference between the depth value of a pixel and the start value, $|Z_{ij}-Z_{start}|$, and a second absolute difference between the depth value and $Z_{diff}$, $|Z_{ij}-Z_{diff}|$, are calculated for the pixels. If the first absolute difference is smaller than the second absolute difference, the pixel is regarded as belonging to the start depth plane and is predictive of the start value otherwise it is classified as belonging to the restart plane and being predictive of the restart value. A pixel belonging to the start plane can be assigned a temporary classification index of $0_{bin}$ (or $1_{bin}$), while restart predictive pixels are assigned the temporary classification index of $1_{bin}$ (or $0_{bin}$). In this case, the restart pixel is identified as the first pixel in traversal order of the block having the second absolute difference larger than the first difference. Thus, the first pixel in the block when traversing row by row starting from the upper row and going downwards having temporary classification index of $1_{bin}$ is regarded as the restart pixel. The depth value of the identified restart pixel is selected as restart depth value in step S12. The method then continues to step S3 of FIG. 1.

In yet another approach, the restart depth value is identified from the plane representations generated for at least a portion of the pixels, preferably each pixel in the block excluding the start pixel. In such a case, the first pixel in traversal order in the block having the plane representation not associated with the first plane to which the start depth value belongs is regarded as the restart depth pixel. The depth value of this pixel is then employed as restart value for the block.

FIG. 5 is a flow diagram illustrating an embodiment of the plane representation generating step of FIG. 1. The method continues from step S2 of FIG. 1. A next step S20 calculates a first difference between the depth value of the pixel and the start depth value. Also a second difference between the depth value and the restart depth value is calculated. In an alternative approach, in particular if the restart depth value has not yet been determined, the second difference is calculated between the depth value and the above-mentioned $Z_{diff}$. If the absolute value of the first difference is smaller than the absolute value of the second difference, $|Z_{ij}-Z_{start}|<|Z_{ij}-Z_{restart}|$ or $|Z_{ij}-Z_{start}|<|Z_{ij}-Z_{diff}|$, the method continues to step S21.

Step S21 generates a first plane representation, such as $0_{bin}$ (or $1_{bin}$), indicative of the first depth value plane. This plane representation is assigned to the current pixel and included as a part of the bit map in the compressed block.

However, if the depth value of the pixel is closer to the restart value than the start value, the method instead continues to step S22. This step S22 generates a second plane representation, such as $1_{bin}$ (or $0_{bin}$), indicative of the second depth value plane. The plane representation is assigned to the pixel and included in the compressed block.

It is anticipated by the present invention that the temporary classification bits determined during the identification of the restart pixel could indeed be employed also for providing the plane representations. In such a case, no dedicated plane representation providing procedure is needed and instead the representations are provided in connection with the restart value selecting procedure.

A further embodiment of generating the plane representations, which though is computationally more expensive is testing all $2^{15}$ possible combinations of plane representations and selecting the one that is most computationally efficient, i.e. leading to the smallest compressed block size.

Yet another embodiment is to use the procedure discussed by Haselgren and Akenine-Möller [2]. Briefly, the start plane is allowed to grow from the start depth value until the prediction error becomes too large. The restart plane is correspondingly allowed to grow from the diagonally opposite position in the block until the error becomes too large. Once the two respective planes together encompassed all blocks, the plane representations are obtained.

The invention also encompasses a further embodiment. In this case, a restart position among the 15 possible positions (in the case of a 4×4 block) is tested. Based on this position, the "best" set or bit map of plane representations is determined. In such a procedure, all pixels at previous positions in traversal order of the block relative the candidate restart position are regarded as having plane representation indicative of the first/start plane. For each pixel following the restart position in traversal order in the block, it is tested whether the pixel belongs to the first/start or second/restart plane. This testing can be performed according to different criteria. A first criterion could be to select the plane representation that results in the smallest prediction error. However, the plane representation resulting in the smallest prediction error for the pixel does not necessarily lead to the most efficient coding of the block. As is further described herein in connection with Golomb-Rice coding, the prediction errors are divided by a value $2^l$, where l is either equal to a determined value k or is a function of k depending on the number of neighboring depth values that was used for calculating the prediction for the current pixel. Depending on whether l=k or l=f(k), a larger prediction error can actually result in shorter resulting compressed block if for instance, the plane representation has a value causing l=f(k) instead of l=k.

The procedure can then be tested for all possible restart positions and all possible plane representations.

FIG. 6 is a flow diagram illustrating an embodiment of the step of determining the encoded representation of the prediction error of FIG. 1. The method continues from step S6 of FIG. 1. A next step S30 modifies the prediction error to get a positive predictive error. This modification preferably involves applying the function n(x)=−2x to negative prediction errors (including zero) and the function p(x)=2x−1 to positive ones (excluding zero). This will result in a new arrangement of prediction errors as {0, 1, −1, 2, −2, 3, −3, . . . }, which means that numbers of small magnitudes will have small values. Each modified prediction error is then preferably Golomb-Rice encoded to obtain the encoded representation.

The Golomb-Rice encoding involves searching for an exponent number k in step S31. This number k is preferably employed for a set of at least one pixel in the block. For instance, four pixels in a 2×2 group in the block or indeed all pixels of a 4×4 can share the same k. An exhaustive search among available values of k, such as between 0 and 15 can be used to find the best k for the group.

A next optional step S32 calculates an exponent value l based on the searched k, i.e. l=f(k). In a preferred embodiment, the function f(k) is equal to w×k+h or $\lfloor w \times k+h \rfloor$ if the pixel set selected in step S4 for the current pixel contains one pixel otherwise the function is equal to k. Thus, if the depth value prediction of a pixel is determined based on a single depth value of the single other pixel in the block and included in the prediction set l=w×k+h, where w is predefined weight and h is a predefined constant, such as w=0.5 and h=10. The optimal values of the weight and constant can be determined through an optimization procedure, involving compressing multiple depth buffers and testing different weight and constant values. The values that lead to optimal compression, i.e. compressing as many of the test depth buffers as possible and furthermore resulting as short compressed buffers in terms of number of bits as possible, are found and can be used. Such an optimization procedure has been conducted to get w=0.5 and h=10. These values can, however, be optimized further according to procedures well-known in the art.

If the pixel set of a current pixel instead comprises multiple other pixels in the block, i.e. the depth value of the pixel is predicted based on the depth values of these other pixels in the block, l=k.

As several pixels can share a same value k it could be possible that all these pixels have the same value/or different values of/depending on the number of pixels in the respective pixel sets selected for the pixels.

A next step S33 divides each prediction error of the group by $2^l$ to form a respective quotient and a remainder. The quotients are unary encoded in a next step S34. This unary encoding is preferably performed according to Table 1 below.

TABLE 1

| Unary code | Quotient |
|---|---|
| $0_{bin}$ | 0 |
| $10_{bin}$ | 1 |
| $110_{bin}$ | 2 |
| $1110_{bin}$ | 3 |
| $11110_{bin}$ | 4 |
| ... | ... |

Unary encoding assigns longer codes to larger values as is evident from Table 1. Generally, values larger than 31 are encoded using $0\mathrm{xffff}_{hex}$ followed by the 16 bits of the value.

The encoded representation of the prediction error comprises the unary code and the 1 bits of the remainder. In addition, the value k is stored for the group of pixels. This procedure is performed for each pixel in the block with the exception of the start pixel and the restart pixel. As was mentioned above, the original depth values for these pixels are stored as start and restart component values, respectively.

The present invention is, though, not limited to the Golomb-Rice coding algorithm. In clear contrast other coding algorithms, such as the Huffman algorithm can alternatively be used.

FIGS. 7A and 7B illustrate a preferred embodiment of the pixel set selecting step and the prediction providing step of FIG. 1. This preferred embodiment is discussed further with reference to FIG. 2, where a pixel 318 denoted as D in the pixel block 300 is to be compressed. The method continues from step S4 of FIG. 1. A next step S40 investigates whether a first neighboring pixel 317 denoted as A present in a first prediction direction in the block relative the pixel 318, a second neighboring pixel 315 denoted as B present in a second prediction direction and a third neighboring pixel 314 denoted as C in FIG. 2 present in a third prediction direction all belong to the same depth value plane as the pixel 318.

The first neighboring pixel 317 is preferably a previous pixel present in the same row as the current pixel 318. Correspondingly, the second neighboring pixel 315 is situated at a previous pixel position in the same column in the block 300. Finally, the third neighboring pixel 314 is preferably a diagonally previous pixel situated diagonally to the upper left relative the pixel 318, i.e. in a previous row and a previous column.

The plane representations of these three neighboring pixels 314, 315, 317, as determined in step S3 of FIG. 1, are compared to the corresponding plane representation of the pixel 318 to be encoded. If they all are equal, i.e. all pixels 314, 315, 317, 318 are regarded as being present in the same depth value plane, the method continues to step S41. Step S41 calculates the prediction of the depth value for the pixel 318 based on the prediction values of the three neighboring pixels 314, 315, 317. In a preferred embodiment, the prediction is calculated as the sum of the depth values of the first 317 and second 315 neighboring pixels subtracted by the depth value of the third neighboring pixel 314, $\hat{Z}_{ij}=Z_{i(j-1)}+Z_{(i-1)j}-Z_{(i-1)(j-1)}$.

However, if not all plane representations of these neighboring pixels 314, 315, 317 are equal to the plane representation of the pixel 318, the method continues from step S40 to step S42. Step S42 investigates whether the first neighboring pixel 317 in the first prediction direction and a second pixel 316 denoted as E in FIG. 2 present in the first prediction direction belong to the same depth value plane as the current pixel 318.

The second pixel 316 is preferably a second previous pixel 316 present in the same row as the current pixel 318 (and the first neighboring pixel 317). If the plane predictions of all these three pixels 316, 317, 318 are equal the method continues to step S43. Step S43 calculates the prediction of the depth value for the pixel 318 based on the prediction values of the two previous pixels 316, 317 selected to be included in the pixel set. In a preferred embodiment, the depth value prediction is calculated to be equal to two times the depth value of the first neighboring pixel subtracted by the depth value of the second pixel, $\hat{Z}_{ij}=2\times Z_{i(j-1)}-Z_{i(j-2)}$.

However, if the plane representations of these three pixels 316, 317, 318 are not equal the method continues from step S42 to step S44. Step S44 investigates whether the second neighboring pixel 315 and a third pixel 312 denoted as F in FIG. 2 present in the second prediction direction belong to the same depth value plane as the current pixel 318.

The third pixel 312 is preferably a second previous pixel 312 present in the same column as the current pixel 318 (and the second neighboring pixel 315). If the plane predictions of all these three pixels 312, 315, 318 are equal the method continues to step S45. Step S45 calculates the prediction of the depth value for the pixel 318 based on the prediction values of the two previous pixels 312, 315 selected to be included in the pixel set. In a preferred embodiment, the depth value prediction is calculated to be equal to two times the depth value of the second neighboring pixel subtracted by the depth value of the third pixel, $\hat{Z}_{ij}=2\times Z_{(i-1)j}-Z_{(i-1)j}$.

In an alternative embodiment of FIG. 7A the order of steps S40, S42 and S44 is changed. For instance, if not all plane representations of the neighboring pixels 314, 315, 317 are equal to the plane representation of the pixel 318 in step S40, the method continues from step S40 to step S44. Thereafter, if not all the pixels 316, 317 have the same plane representation as the current pixel 318 the method continues from step S44 to step S42.

Furthermore, the procedure of FIG. 7A can instead start with the check of step S42 going to step S40 and then step S44, start with S42 going to step S44 and then step S40. Correspondingly, the procedure can start with the investigation of step S44, continuing to step S40 and then S42 or start with step S44, then S42 and finally step S40.

Thus, the order of these three steps S40, S42, S44 can be any predefined order. The particular order selected for the blocks to be compressed does not affect the coding quality of the invention.

If none of the above-discussed conditions are met, the method continues to step S46 of FIG. 7B. This step S46 investigates whether the first 317 and second 315 neighboring pixels belong to the same depth value plane as the pixel 318 using the respective plane representations. If they all belong to the same plane, a next step S48 (step S47 is performed during decompression but not compression) selects one of the depth values of the two neighboring pixels 315, 317 as depth value prediction for the current pixel. In a preferred embodiment, the depth value that is closest to the depth value of the pixel 318 is selected. In other words, if $|Z_{i(j-1)}-Z_{ij}|<|Z_{(i-1)j}-Z_{ij}|$, $\hat{Z}_{ij}=Z_{i(j-1)}$ otherwise $\hat{Z}_{ij}=Z_{(i-1)j}$. In an alternative approach, the prediction is calculated from the selected depth value, i.e. $\hat{Z}_{ij}=f(Z_{i(j-1)})$ or $\hat{Z}_{ij}=f(Z_{(i-1)j})$.

A next step S49 provides a guide bit associated with the selected pixel of the first 317 and second 315 neighboring pixel to use as prediction basis for the current pixel 318. As the selection is between two neighboring pixels 315, 317, the guide bit can, as its name suggests, be a 1-bit selection word.

In an alternative embodiment, the method does not directly continue from step S46 to step S48. This embodiment involves performing a further check to investigate whether the two neighboring pixels 315, 317 have substantially the same depth value. As consequence, the absolute difference between the depth values can be calculated and if the difference is smaller than a predefined threshold, $|Z_{i(j-1)}-Z_{(i-1)j}|<T$, the average of the two values is calculated and used as prediction, i.e.

$$\hat{Z}_{ij} = \frac{Z_{i(j-1)} + Z_{(j-1)i}}{2},$$

If only integer predictions are desirable, the average can be rounded or input to a floor (or ceiling) function, such as $$\hat{Z}_{ij} = \left\lfloor \frac{Z_{i(j-1)} + Z_{(j-1)i}}{2} \right\rfloor.$$

In this case, no extra guiding bit is required.

If the absolute difference exceeds the threshold, the method continues to step S48 and one of the neighboring pixels 315, 317 are employed as prediction basis for the current pixel 318.

If not both the first 317 and second 315 neighboring pixels belong to the same depth value plane as the current pixel 318, the method continues from step S46 to step S50. Step S50 investigates whether the first neighboring pixel 317 is present in the same depth plane as the pixel 318. In such a case, step S51 defines the depth value prediction based on the depth value of the first neighboring pixel, preferably sets the prediction to be equal to the neighboring depth value, $\hat{Z}_{ij}=Z_{i(j-1)}$.

If the first neighboring pixel 317 does not belong to the same depth value plane as the current pixel 318, the method continues from step S50 to step S52. This step S52 is performed in a similar manner to step S50 but instead investigates whether the second neighboring pixel 315 belongs to the same depth plane as the pixel 318. If this is true as determined based on a comparison of the their respective plane representations, the method continues to step S53, where the prediction for the pixel 318 is determined based on the depth value of the second neighboring pixel 315 and is preferably $\hat{Z}_{ij}=Z_{(i-1)j}$.

If neither the first 317 nor second 315 neighboring pixels belong to the same depth plane as the pixel 318, the method continues to step S54. Step S54 selects the prediction of the pixel 318 to be based on one of the start depth value and the restart depth value. The prediction is selected based on what plane the pixel 318 belongs to. If it belongs to the same plane as the start value, $\hat{Z}_{ij}=Z_{start}$ is used, otherwise $\hat{Z}_{ij}=Z_{restart}$ is used. In an alternative approach, the prediction is calculated from the selected depth value, i.e. $\hat{Z}_{ij}=f(Z_{start})$ or $\hat{Z}_{ij}=f(Z_{restart})$.

Thereafter, once a depth value has been provided in either of the steps S41, S43, S45, S48, S51, S53 or S54, the method continues to step S6 of FIG. 1, where the prediction error is estimated based on the provided depth value prediction.

In the discussion above, the first neighboring pixel has been disclosed as a previous pixel present in the same row of the pixel block as the current pixel to be encoded. This is, however, merely an illustrative example of a possible implementation. In an alternative embodiment, the first neighboring pixel can be a previous pixel present in the same column in the pixel block as the current pixel. In such a case, the second neighboring pixel is preferably a previous pixel present in the same row in the block as the current pixel.

If any of the pixels denoted A to F in the procedure disclosed in FIGS. 7A to 7B is indeed present outside the block, that pixel is treated as not belonging to the same depth value plane as pixel to be encoded. For instance, assume that pixel 317 of FIG. 2 should be encoded. Furthermore, in this example the third 313 neighboring pixel belongs to a plane different from the pixel 317. The condition of step S40 of FIG. 7A is therefore not met and the method continues to step S42. However, in this case the second pixel in the first prediction direction will be positioned outside of the block boundaries. This pixel can therefore be regarded as having a plane representation different from the pixel 317. The method therefore continues from step S42 to S44.

This means that for pixels 311, 312, 313, 316 present in the first row or first column, the depth value prediction will be equal to the depth value of the neighboring previous pixel in the same first row or first column or calculated from the depth values of the most previous pixels in the first row or first column, i.e. $\hat{Z}_{1j}=Z_{1(j-1)}$, $\hat{Z}_{i1}=Z_{(i-1)1}$, $\hat{Z}_{1j}=2\times Z_{1(j-1)}-Z_{1(j-2)}$ or $\hat{Z}_{i1}=2\times Z_{(i-1)1}-Z_{(i-2)1}$ with $Z_{11}=Z_{start}$.

FIG. 8 is a schematic illustration of a compressed representation 400 of a pixel block compressed according to the present invention. Before rendering, all blocks are preferably cleared and contain only the $Z_{far}$ value. Even after rendering in a block has started, it is common to have many pixels being set to the $Z_{far}$ value. Therefore, many start values will be equal to the $Z_{far}$ value. It is therefore advantageous to have a special case to signal this. Therefore, the compressed block 400 preferably comprises one bit 410 to signal whether the current block has a start depth value equal to $Z_{far}$. A representation 420 of the start value is included in the compressed block 400 or is omitted if the clear bit 410 is set. The compressed block 400 also includes a representation 430 of the restart value. The bit map of plane representations 440 is also included in the block 400 as are the determined k values 450. In a typical embodiment, the bit map 440 comprises 15 plane representations, with one such representation per pixel excluding the start pixel. However, there are other more efficient ways of coding such plane representations, which are known in the art and can be applied to the invention. Extra guiding bits 460 may be included depending on which predictions that were selected for the pixels. The compressed block 400 also comprises the unary code of the quotient and the remainders from the Golomb-Rice encoding, denoted encoded error representations 470 in the figure.

The actual order of the included components of the compressed block 400 may differ from what is illustrated in FIG. 8.

Decompression

FIG. 9 is an illustration of a flow diagram showing a method of decompressing or decoding a compressed or coded pixel block according to the present invention. The method starts in step S60, which provides a start depth value for the block. This start value is provided based on a start value representation comprised in the compressed pixel block. In a preferred embodiment, the start depth value is provided in uncompressed form in the compressed block and can therefore be assigned directly as depth value of the start pixel. This pixel has a predefined positioned in the block as previously discussed, preferably at $(i,j)=(1,1)$. Alternatively, a bit can indicate whether the start depth value is equal to the $Z_{far}$ value, and in those cases avoid storing the start value explicitly.

A next step S61 provides a restart depth value for the compressed block.

This value is provided based on a restart value representation comprised in the compressed block. This representation comprises the restart value, preferably in uncompressed form. The position of the restart pixel is typically obtained from the plane representation. The first pixel in the traversal direction that does not have the same plane representation as the start depth value is the position of the restart value. Step S61 involves identifying the restart pixel in the block from the plane representation and assigning the restart value as depth value for this identified pixel. As was noted in the foregoing, the start and restart depth values are regarded as belonging to different depth value planes.

The loop of the next steps S62 to S65 is performed for each pixel to be decoded in the block. Step S62 determines the prediction error for the pixel based on the encoded error representation associated with the pixel and included in the compressed block.

The prediction error is preferably performed by Golomb-Rice decoding the encoded representation of the prediction error. In such a case, the prediction error preferably comprises a unary coded quotient, a remainder and an exponent value k. The quotient can be obtained from the unary coded data using Table 1 above. Thereafter, the quotient and remainder forms a value that is multiplied by $2^l$ to form the prediction error, where the value/is equal to k or a function of k depending on whether the pixel set of the current pixel comprises one or multiple other pixels.

A next step S63 selects the pixel set comprising at least one other pixel in the block. This selection is performed based on the respective plane representations associated with the pixels. As has been discussed in the foregoing, a plane representation is indicative of which plane of the start and restart depth planes a pixel belongs to.

A prediction of the depth value of the pixel is provided in step S64. This step S64 preferably involves providing the prediction based on the depth value(s) of the at least one pixel in the selected pixel set. Thus, the at least one depth value of the pixel set is used for providing or calculating the depth value prediction.

Finally, step S65 calculates a representation of the depth value of the pixel based on the prediction error determined in step S62 and the depth value prediction provided in step S64. This calculation is preferably implemented by adding the determined prediction error to the prediction to get the depth value of the decoded pixel.

The decompressing method of FIG. 9 is preferably repeated for each pixel in the block to be decoded, which is schematically illustrated by the line L3. This means that the method can be performed once or multiple times, such as once per pixel in block, for a given compressed block.

FIG. 10 is a flow diagram illustrating an additional step of the decompression method. The method continues from step S60 of FIG. 9. A next step S70 provides the respective plane representations associated with the pixels from comprised in the compressed block. The retrieved plane representations are then used in step S61 of FIG. 10 for identifying the restart pixel and then in step S63 for identifying the correct pixel set for the pixel and thereby the correct depth value prediction for the pixel.

A preferred embodiment of the pixel set selecting step and prediction providing step of FIG. 9 is illustrated in FIGS. 7A and 7B. The procedure is then performed as previously described for, step-by-step, identifying the correct prediction set in steps S40, S42, S44, S46, S50 or S52 based on the provided plane representations. Once the correct pixel set has been identified, the depth value prediction is determined based on the depth values of the pixel set according to one of the steps S41, S43, S45, S48, S51, S53 or S54.

The difference of this embodiment as compared to the procedure performed during compression is that, if it is concluded in step S46 that the both the first and second neighboring pixels belong to the same plane as the current pixel to decode, the method continues to step S47. Step S47 provides a guide bit associated with the current pixel and included in the compressed block. The guide bit indicates which of the first and second neighboring pixels to use as prediction basis for the pixel. The selection of depth value prediction in step S48 is therefore performed based on the associated guide bit. The next step S49 is not conducted during decompression but is only performed in connection with compression.

As was mentioned in the foregoing, the usage of guide bit might be omitted in case the two previous pixels of the same row or column as the current pixel, respectively, has equal or near equal depth values. In such a case, the prediction is determined from the average of the two neighboring depth values.

Decompression Example

In the following example a block size as illustrated in FIG. 2 and a compressed block layout as illustrated in FIG. 8 are assumed.

$Z_{far}$ bit: $0_{bin}$
Start value: $01001110100110101010001_{bin}$
Restart value: $00000010100110101010001_{bin}$
Plane representations 0 0 0 1 0 0 0 1 1 1 1 1 1 1 1$_{bin}$
k values: $X_1 X_2 \ldots X_n$, where $X_i = 0/1_{bin}$, i=1 ... n
Guiding bits: none
Encoded representation: $Y_1 Y_2 \ldots Y_m$, where $Y_i = 0/1_{bin}$, i=1 ... m The $Z_{far}$ bit is not set for the current block, implying that the start value should not be set to the $Z_{far}$ value. Instead the start value should be obtained directly from the start value bits. The position of the restart pixel is obtained from the plane representations. The first nonzero bit in the plane representation bit vector is at position 4, and therefore the position of the restart pixel is 4, which corresponds to (2,1) if (1,1) has position number 0, (1, 2) has position number 1 and so on in traversal order. The restart value is $00000010100110101010001_{bin}$=170705. As a consequence, $Z_{(2,1)} = Z_{restart} = 170705$. The start pixel is at position (1,1) and the start value is $01001110100110101010001_{bin}$=5151441. Therefore, $Z_{(1,1)} = Z_{start} = 5151441$. The partly decoded block now looks like:

| 5151441 | | | |
| 170705 | | | |
| | | | |
| | | | |

Thereafter the block is decoded in traversal order starting with the first row. All remaining pixels of the first row have the plane representations set to $0_{bin}$ indicating that they belong to the same depth value plane as the start depth value. The plane representations of the pixels are according to below:

| - | $0_{bin}$ | $0_{bin}$ | $0_{bin}$ |
| $1_{bin}$ | $0_{bin}$ | $0_{bin}$ | $0_{bin}$ |
| $1_{bin}$ | $1_{bin}$ | $1_{bin}$ | $1_{bin}$ |
| $1_{bin}$ | $1_{bin}$ | $1_{bin}$ | $1_{bin}$ |

Following the decompressing embodiment of FIGS. 7A to 7B, it can be seen that the next pixel at position (1, 2) should have prediction set comprising the first neighboring pixel according to step S50 as there are no second or third previous neighboring pixels. This means that $\hat{Z}_{(1,2)}=Z_{(1,1)}=5151441$.

In the following example, the prediction errors are determined through Golomb-Rice decoding, which is not disclosed herein. Therefore assume that the decoded prediction errors for the block are as present below:

| -   | 10  | 10  | 10  |
| --- | --- | --- | --- |
| -   | 15  | 15  | 15  |
| -25 | 30  | 30  | 30  |
| -25 | -15 | -15 | -15 |

The depth value of the second pixel can therefore be calculated as: $Z_{(1,2)}=\tilde{Z}_{(1,2)}+\hat{Z}_{(1,2)}=10+5151441=5151451$. The next pixel in the first row meets the requirements of step S42 and therefore has $\hat{Z}_{(1,3)}=2\times Z_{(1,2)}-Z_{(1,1)}=5151461$. The corresponding depth value of the third pixel in the first row is $Z_{(1,3)}=\tilde{Z}_{(1,3)}+\hat{Z}_{(1,3)}=10+5151461=5151471$. The procedure is repeated for the fourth and last pixel in the first row to give the partly decoded block of:

| 5151441 | 5151451 | 5151471 | 5151501 |
| ------- | ------- | ------- | ------- |
| 170705  |         |         |         |
|         |         |         |         |
|         |         |         |         |

Thereafter, the remaining pixels in the second row are decoded. The second pixel in the second row meets the requirements of step S52 and therefore has a depth value of $Z_{(2,2)}=\tilde{Z}_{(2,2)}+\hat{Z}_{(2,2)}=\tilde{Z}_{(2,2)}+Z_{(1,2)}=15+5151451=5151466$. The third pixel of the second row meets the criterion of step S40 and is decoded as:

$$Z_{(2,3)}=\tilde{Z}_{(2,3)}+\hat{Z}_{(2,3)}=\tilde{Z}_{(2,3)}+Z_{(2,2)}+Z_{(1,3)}-Z_{(1,2)}=15+5151466+5151471-5151451=5151501$$

The same procedure is performed for the last pixel of the second row to get the partly decoded block of:

| 5151441 | 5151451 | 5151471 | 5151501 |
| ------- | ------- | ------- | ------- |
| 170705  | 5151466 | 5151501 | 5151531 |
|         |         |         |         |
|         |         |         |         |

Repeating the decoding procedure for the remaining two row leads to the finally decoded block of:

| 5151441 | 5151451 | 5151471 | 5151501 |
| ------- | ------- | ------- | ------- |
| 170705  | 5151466 | 5151501 | 5151531 |
| 170680  | 170710  | 170770  | 170860  |
| 170630  | 170645  | 170690  | 170765  |

The calculated depth values according to above can then optionally be remapped to floating point numbers as discussed above in connection with FIG. 3.

Implementation Aspects

FIG. 11 is a schematic overview of a depth buffer architecture 1, to which the teachings of the present invention can be applied. The architecture comprises a random access memory (RAM) 50 for storing pixel blocks comprising, among others, depth values. A depth unit 10 comprises a decompressing system 200 according to the present invention for decompressing compressed blocks fetched from the RAM 50. The decompressed or decoded blocks are temporarily stored in an associated tile cache 14 of the depth unit 10. A compressing system 100 according to the present invention is also provided in the depth unit 10 for compressing pixel blocks present in the cache 14 for storage in the RAM 50.

In a preferred embodiment, the depth unit 10 also comprises a tile table cache 12. This table cache 12 store header information associated with the pixel blocks but kept separately from the depth buffer data. The tile table entries typically contains flags signaling whether the associated pixel block is stored in uncompressed form or in a compressed form in the RAM 50. In the latter case, the flag preferably also signals the size of the compressed block, as different compressed blocks can have different total bit lengths. For example, a 2-bit flag can be used for signaling uncompressed block, compressed with 75% of original size, compressed with 50% of original size or compressed with fast Z-cleared.

A rasterizer 20 is connected to the depth unit 10 and performs the actual rasterization of pixels. The rasterizer 20 is connected to one or multiple pixel pipelines 30 that are employed for computing the depth and color of a pixel. Each pixel pipeline 30 is connected to a depth testing unit 40 responsible for discarding pixels that are occluded, i.e. having a larger depth value, by previously drawn geometry. In some embodiments, the order of the pixel pipelines 30 and the depth tests 40 can be interchanged.

Compressor

FIG. 12 is a schematic block diagram of a compressor or compressing system 100 according to the present invention. The system 100 comprises a start selector 110 implemented for selecting a start depth value for the block to be compressed. The selector 110 preferably selects the start value to be equal to the depth value of a pixel at a predefined pixel position in the block, such as the pixel at the upper left corner of the block. This start depth value is regarded as belonging to a first (start) depth plane and a representation of the start depth value is included in the compressed block.

A restart selector 120 is arranged for selecting a restart depth value for the block. This restart selector 120 preferably selects the restart value to be equal to the depth value of a pixel identified in the block. The restart value is regarded as belonging to a second (restart) depth plane and a representation of the restart value is included in the compressed block.

The compressing system 100 also comprises a plane representation generator 130 for generating a plane representation of a pixel. The representation is indicative of which plane of the start and restart plane the pixel belongs to. The plane generator preferably generates plane representations for at least a portion of the multiple pixels in the block and more preferably for each pixel possibly excluding the start pixel. In such a case, the restart selector 120 can use the plane representations for identifying the correct restart pixel as previously described. This means that the plane representations can also be regarded as a representation of the position of the restart pixel in the block.

A set selector 140 is provided for selecting a pixel set of at least one pixel in the block for a pixel to be encoded. This set selection is furthermore performed based on the plane representations of the pixels determined by the representation generator 130. The set can include one or multiple, such as two or three, pixels present in different prediction directions in the block as previously described.

A prediction of the depth value of a pixel is determined by the prediction provider 150. In such a case, the provider 150 generates the depth prediction based on the depth value(s) of the pixel(s) included in the pixel set from the set selector 140.

The provided depth prediction is used by an error estimator 160 for estimating or calculating a prediction error for the pixel. This error is preferably calculated as a difference between the prediction determined by the prediction provider 150 and the original depth value of the pixel.

A representation determiner 170 is implemented in the compressing system 100 for determining an encoded representation of the prediction error from the error estimator 160. This error representation is assigned to the pixel and included in the compressed pixel block.

The compressing system 100 may optionally comprise a guide bit provider 180 implemented for providing a guide bit used for signaling which of two available neighboring pixels to use as prediction basis for the current pixel. In such a case, both these two neighboring pixels belong to the same depth value plane as the pixel and the guide bit is employed for discriminating between the depth values of the two pixels.

The units 110 to 180 of the compressing system 100 may be provided as software, hardware or a combination thereof. The units 110 to 180 may be implemented together in the compressing system 100. Alternatively, a distributed implementation is also possible with some of the units provided elsewhere in the depth buffer architecture.

The restart selector 120 can be implemented for identifying the restart pixel through an exhaustive search testing each available bit position in the block (excluding the position of the start pixel). The restart position and restart value leading to the most efficient compressed block, i.e. shortest bit length of the compressed block representation, is then selected. FIG. 13 illustrates an alternative implementation of the restart selector 120.

The restart selector 120 comprises a value identifier 122 arranged for identifying the pixel in the block having a depth value differing the most from the start depth value from the start selector. A difference calculator 124 is implemented for calculating, preferably for each pixel, a first difference between the depth value and the start value, $Z_{ij}-Z_{start}$, and a second difference between the depth value and the most differing value, $Z_{ij}-Z_{diff}$. If the absolute value of first difference is the smallest for a pixel, the pixel is regarded as belonging to the start depth plane. However, if $|Z_{ij}-Z_{diff}|<|Z_{ij}-Z_{start}|$, the pixel instead belongs to the restart depth plane.

A value selector 126 investigates all those pixels regarded as belonging to the restart plane and identifies the restart pixel as the first pixel in traversal order ((1,1)→(1, 4),(2,1)→(2,4), (3,1)→(3,4),(4,1)→(4,4) in the case of a 4×4 pixel block) that belongs to the restart value plane. The compressed block representation then preferably comprises a representation of the restart value, i.e. the depth value of the identified restart pixel.

The units 122 to 126 of the restart selector 120 may be provided as software, hardware or a combination thereof. The units 122 to 126 may be implemented together in the restart selector 120. Alternatively, a distributed implementation is also possible with some of the units provided elsewhere in the compressing system.

The restart selector 120 can alternatively operate according to any of the other embodiments discussed previously in the present document. For instance, the restart selector 120 can use the information from the plane representation generator 130 for identifying the restart pixel as the first pixel in traversal order regarded as belonging to a plane different from the plane of the start depth value.

FIG. 14 is a schematic block diagram of an embodiment of the plane representation generator 130. The generator 130 comprises a difference determiner 132 implemented for determining a first difference between a depth value of a pixel and the start depth value. The generator 130 also calculates a second difference between the depth value and the restart depth value or the value in the block differing the most from the start value, i.e. $Z_{diff}$.

A representation generator 134 is included in the plane generator 130 for generating the plane representation of the pixel to be indicative of the start depth value plane if the absolute value of the first difference is smaller than the absolute value of the second difference. Otherwise the generator 134 provides a plane representation that is indicative of the restart plane.

The units 132 and 134 of the plane representation generator 130 may be provided as software, hardware or a combination thereof. The units 132 and 134 may be implemented together in the generator 130. Alternatively, a distributed implementation is also possible with some of the units provided elsewhere in the compressing system.

In a preferred embodiment the set selector 140 investigates the plane representation of a pixel to be encoded with the plane representations of three previous neighboring pixels present in different prediction directions in the block. If all these four pixels belong to the same plane, a prediction calculator 152 of the prediction provider 150 illustrated in FIG. 15 calculates the depth value prediction for the pixel based on the depth values of the three neighboring pixels. In a preferred implementation, the calculator 152 calculates the prediction as $\hat{Z}_{ij}=Z_{i(j-1)}+Z_{(i-1)j}-Z_{(i-1)(j-1)}$.

If not all the three neighboring pixels belong to the same plane as the pixel, the set selector preferably investigates whether the first neighboring pixel and a second pixel present in the same row (or column) as the first neighboring pixel and the current pixel. In such a case, the calculator 152 determines the prediction based on the depth values of these two pixels, preferably as $\hat{Z}_{ij}=2\times Z_{i(j-1)}-Z_{i(j-2)}$.

If not both the first neighboring pixel and the second pixel belong to the same plane as the current pixel, the set selector checks if the second neighboring pixel and a third pixel present in the same column (or row) as the second neighboring pixel and the current pixel. If this condition is met, the prediction calculator 152 determines the prediction based on the depth values of these two pixels, preferably as $\hat{Z}_{ij}=2\times Z_{(i-1)j}-Z_{(i-2)j}$.

Alternatively, the order of the above mentioned checks can be different as discussed in the foregoing.

However, if none of the conditions is met, the set selector investigates whether both the first and second neighboring pixels belong to the same depth value plane as the present invention. In such a case, the depth value of these two pixels that is closest to the depth value of the current pixel, i.e. resulting in smallest absolute difference, is selected by the prediction provider 150 as prediction for the pixel. Furthermore, the guide bit provider of the compressing system assigns a guide bit to the pixel, where this guide bit indicates the selected pixel of the first and second neighboring pixels.

Alternatively, the depth values of these two pixels are compared to see if they differ much from each other. If not, the prediction provider 150 determines the prediction to be based on the average of the two depth values, possibly after rounding. If the two values, though, differs from each other with more than a defined threshold value, either of them are selected as described above.

If not both the first and second neighboring pixels belong to the same plane as the current pixel, the set selector checks if the first neighboring pixel belong to the same plane and then, if this is not true, investigates whether the second neighboring pixel belong to the same plane as the pixel to encode. The prediction provider 150 sets the depth value prediction to be equal to the depth value of the one of the first and second neighboring pixel belonging to the same plane as the pixel.

Finally, if none of the first and second neighboring pixels belong to the same plane as the pixel as determined based on the plane representations, the set selector determines the set to contain either the start pixel or the restart pixel. The pixel to choose from these two can be determined based on the plane representation of the current pixel. Thus, if the representation is indicative of the restart plane, the set comprises the restart pixel otherwise it contains the start pixel. This means that the prediction provider selects the depth value prediction to be one of the start and restart depth values.

The unit 152 of the prediction provider 150 may be provided as software, hardware or a combination thereof. The unit 152 may be implemented together in the prediction provider 150. Alternatively, a distributed implementation is also possible with some of the unit provided elsewhere in the compressing system.

FIG. 16 is a block diagram illustration a preferred implementation of the representation determiner 170 of FIG. 12 in more detail. The determiner 170 comprises an error modifier 172. This modifier 172 processes the calculated prediction error to get a positive prediction error as previously described, i.e. inputting the prediction error x into the function $n(x)=-2x$ for negative prediction errors (including zero) and into the function $p(x)=2x-1$ for positive ones (excluding zero). The resulting modified prediction error is encoded, preferably by a Golomb-Rice coder 174. This coder 174 outputs the encoded prediction error representation based on an encoding of the positive error from the error modifier 172.

Generally, the coder 174 comprises a value searcher for searching for a value k. The value k is preferably determined for a group of pixels in the block so that these pixels share the same value k. This saves number of bits of the final compressed block representation as compared to having a dedicated value k for each pixel in the block. The value searcher 171 can perform an exhaustive search among all available values k, such as $0 \leq k \leq 15$. The value k leading to the most efficient coding, i.e. shortest compressed block representation is then selected and used for the pixel group.

A number provider 173 provides an exponent number l based on the determined value k. In a preferred embodiment, this number l is determined by the provider 173 to be equal to k if the pixel set selected by the set selector comprises multiple pixels. Otherwise, $l=w \times k+h$ or $l=\lfloor w \times k+h \rfloor$, where w is a weight value, preferably $w=0.5$, and h is a constant, preferably $h=10$.

A divider 175 uses the determined value l and divides the prediction errors of the pixels in the current group by the number $2^l$ to get a quotient and a l-bit remainder. A unary coder 177 is provided for unary encoding the quotient according well known procedures. The encoded prediction error representation of a pixel then comprises the unary coded quotient, the remainder and the value k.

The units 171 to 177 of the representation determiner 170 may be provided as software, hardware or a combination thereof. The units 171 to 177 may be implemented together in the representation determiner 170. Alternatively, a distributed implementation is also possible with some of the units provided elsewhere in the compressing system.

Decompressor

FIG. 17 is a schematic block diagram of a decompressor or decompressing system 200 according to the present invention. The system 200 comprises a start provider 210 for providing a start depth value of the pixel block. The provider 210 provides this start value based on a start value representation comprised in the compressed pixel block. This start value is preferably assigned as depth value of a pixel having a predefined position in the pixel block.

A restart provider 220 correspondingly provides a restart depth value based on information in the compressed block. This information comprises a representation of the actual restart value. Furthermore, the compressed block also comprises information allowing identification of the particular restart position in the block. This position information can be the bit map of plane representations or, though less preferred, a dedicated restart position word. The identified pixel (restart pixel) is then assigned the restart value as depth value.

The system 200 also comprises an error determiner 230 for determining a prediction error for at least one pixel in the block. This prediction error is determined based on an encoded error representation associated with the pixel and included in the block.

A set selector 240 selects a pixel set comprising at least one other previously decoded pixel in the block based on plane representations associated with the pixels. These plane representations are preferably fetched from the compressed pixel block by a plane provider 270. The operation of the set selector 240 is similar to the set selector 240 discussed in connection with the compressing system of FIG. 12 and further in connection with FIGS. 7A and 7B.

A prediction provider 250 then provides a prediction of the depth value of the pixel to be decoded based on the depth value(s) of the pixel(s) included in the selected pixel set.

A representation calculator 260 uses the prediction from the prediction provider 250 together with the prediction error from the error determiner 230 to calculate a representation of the depth value of the pixel and thereby generate a decoded pixel.

The units 210 to 270 of the decompressing system 200 may be provided as software, hardware or a combination thereof. The units 210 to 270 may be implemented together in the decompressing system 200. Alternatively, a distributed implementation is also possible with some of the units provided elsewhere in the depth buffer architecture.

FIG. 18 is a schematic block diagram of an embodiment of the error determiner 230. The determiner 230 comprises a Golomb-Rice decoder 232 operating on the encoded prediction error representation in the compressed block. In particular, the decoder 232 uses a unary coded quotient, a l-bit remainder and a value k of a pixel to calculate the prediction error as previously described.

The unit 232 of the error determiner 230 may be provided as software, hardware or a combination thereof. The unit 232 may be implemented together in the error determiner 230. Alternatively, a distributed implementation is also possible with some of the unit provided elsewhere in the decompressing system.

FIG. 19 is a possible implementation of the prediction provider 250 of FIG. 17. The provider comprises a prediction calculator 252 arranged for calculating the depth value prediction based on depth values of multiple pixels included in the pixel set selected by the set selector. The calculator 252 calculates the prediction as discussed above in connection with steps S41, S43 or S45 of FIG. 7A depending on which particular pixel set that is selected. Otherwise, the prediction provider 250 provides the depth value prediction as disclosed in steps S48, S51, S53 or S54 of FIG. 7B.

The unit 252 of the prediction provider 250 may be provided as software, hardware or a combination thereof. The unit 252 may be implemented together in the prediction provider 250. Alternatively, a distributed implementation is also possible with some of the unit provided elsewhere in the decompressing system.

In a particular embodiment, the set selector of the compressing or decompressing system is arranged for selecting the pixel set to contain a first neighboring pixel present in a first prediction direction in the block relative at least one pixel to be compressed or decompressed, a second neighboring pixel present in a second prediction direction in the block relative the at least one pixel and a third neighboring pixel present in a third prediction direction in the block relative said at least one pixel if the first, second and third neighboring pixels belong to a same depth value plane as the at least one pixel as determined based on the plane representations.

In such a case, the prediction provider of the compressing or decompressing system comprises a prediction calculator for calculating the prediction to be equal to a sum of the depth values of the first and second neighboring pixels subtracted by a depth value of the third neighboring pixel.

In another particular embodiment, the set selector is arranged for selecting the pixel set to contain a first neighboring pixel present in a first prediction direction in the block relative the at least one pixel and a second pixel in the first prediction direction if the first neighboring pixel and the second pixel belong to a same depth value plane as the at least one pixel as determined based on the plane representations.

In such a case, the prediction provider comprises a prediction calculator for calculating the prediction to be equal to two times a depth value of the first neighboring pixel subtracted by a depth value of the second pixel.

In a further particular embodiment, the set selector is arranged for selecting the pixel set to contain a second neighboring pixel present in a second prediction direction in the block relative the at least one pixel and a third pixel in the second prediction direction if the second neighboring pixel and the third pixel belong to a same depth value plane as the at least one pixel as determined based on the plane representations.

In such a case, the prediction provider comprises a prediction calculator for calculating the prediction to be equal to two times a depth value of the second neighboring pixel subtracted by a depth value of said third pixel.

The set selector is preferably arranged for selecting the pixel set to contain one of the first neighboring pixel and the second neighboring pixel if not all of the first, second and third neighboring pixels belong to a same depth value plane as said at least one pixel, and if not all of the first neighboring pixel and the second pixel belong to a same depth value plane as the at least one pixel, and if not all of the second neighboring pixel and the third pixel belong to a same depth value plane as the at least one pixel but the first and second neighboring pixels belong to a same depth value plane as the at least one pixel as determined based on said plane representations. The compressing system further comprising a guide provider for providing a guide bit associated with the selected pixel of the first and second neighboring pixels, wherein the compressed representation of the block comprises the guide bit.

The set selector of the decompressing system is preferably arranged for selecting, based on a guide bit assigned to the at least one pixel and comprised in the compressed pixel block, the pixel set to contain one of the first neighboring pixel and the second neighboring pixel if not all of the first, second and third neighboring pixels belong to a same depth value plane as the at least one pixel, and if not all of the first neighboring pixel and the second pixel belong to a same depth value plane as the at least one pixel, and if not all of the second neighboring pixel and the third pixel belong to a same depth value plane as the at least one pixel but the first and second neighboring pixels belong to a same depth value plane as the at least one pixel as determined based on the plane representations.

Furthermore, the set selector is preferably arranged for selecting the pixel set to contain the first neighboring pixel if not all of the first, second and third neighboring pixels belong to a same depth value plane as the at least one pixel, and if not all of the first neighboring pixel and the second pixel belong to a same depth value plane as the at least one pixel, and if not all of the second neighboring pixel and the third pixel belong to a same depth value plane as the at least one pixel, and if not the second neighboring pixel belong to a same depth value plane as the at least one pixel but the first neighboring pixel belong to a same depth value plane as the at least one pixel as determined based on the plane representations.

The set selector is preferably also arranged for selecting the pixel set to contain a pixel associated with the start depth value or the restart depth value if not all of the first, second and third neighboring pixels belong to a same depth value plane as the at least one pixel, and if not all of the first neighboring pixel and the second pixel belong to a same depth value plane as the at least one pixel, and if not all of the second neighboring pixel and the third pixel belong to a same depth value plane as the at least one pixel, and if not the first neighboring pixel belong to a same depth value plane as the at least one pixel, and if not the second neighboring pixel belong to a same depth value plane as the at least one pixel as determined based on the plane representations.

FIG. 20 is a diagram illustrating compression performance for the "Shadow" scene for different resolutions, where 100% represents the original bandwidth. The hatched line corresponds to the depth buffer compression scheme presented by Hasselgren and Akenine-Möller [2] and the continuous line represents the depth buffer compression of the invention. Note how the invention performs better than the current state of the art for all resolutions bar the highest one.

The same scene has been used in a number of resolutions in order to test the performance for different sizes of triangles. A low resolution means that the triangles are small in comparison to the pixels, i.e. a "high complexity" type of scene. A high resolution means that the triangles are large in comparison to the pixels, representing a "low complexity" type of scene. It will be understood by a person skilled in the art that various modifications and changes may be made to the present invention without departure from the scope thereof, which is defined by the appended claims.

REFERENCES

[1] Rasmusson, Hasselgren and Akenine-Möller, "Exact and Error-bounded Approximate Color Buffer Compression and Decompression", *Graphics Hardware,* 2007, pp. 41-48
[2] Haselgren and Akenine-Möller, "Efficient Depth Buffer Compression", *Graphics Hardware,* 2006, pp. 103-110
[3] Lapidous and Jiao, "Optimal Depth Buffer for Low-Cost Graphics Hardware", *Graphics Hardware,* 1999, pp 67-73

The invention claimed is:

1. A method of compressing a block of multiple pixels each comprising a respective depth value, said method comprising the steps of:

selecting a start depth value of the multiple depth values in said block, said start depth value belonging to a first depth value plane;

selecting a restart depth value of said multiple depths values in said block, said restart depth value belonging to a second depth value plane;

generating, for at least a portion of said multiple pixels, a respective plane representation indicative of which plane of said first and second depth value planes said at least a portion of said multiple pixels belong to;

selecting, for at least one pixel in said block, a pixel set to comprise a first neighboring pixel present in a first prediction direction in said block relative said at least one pixel and a second pixel in said first prediction direction if said first neighboring pixel and said second pixel belong to a same depth value plane as said at least one pixel as determined based on said plane representations;

providing a prediction of a depth value of said at least one pixel based on the at least one depth value of said selected pixel set;

estimating a prediction error based on said depth value of said at least one pixel and said prediction; and determining an encoded representation of said prediction error, wherein a compressed representation of said block comprises a representation of said start depth value, a representation of said restart value and said encoded representation of said prediction error.

2. The method according to claim 1, wherein said step of selecting said restart depth value comprises the steps of:

identifying a depth value of said multiple depth values in said block differing most from said start depth value;

determining, for at least a portion of said multiple pixels, a respective first difference between a depth value of a pixel and said start depth value;

determining, for said at least a portion of said multiple pixels, a respective second difference between said depth value of said pixel and said identified depth value; and selecting said restart depth value based on said determined first and second differences.

3. The method according to claim 1, wherein said generating step comprises the steps of:

determining a first difference between a depth value of a pixel and said start depth value;

determining a second difference between said depth value of said pixel and a depth value of said block differing most from said start depth value; and generating said plane representation to be indicative of said first depth value plane if an absolute value of said first difference is smaller than an absolute value of said second difference and otherwise generating said plane representation to be indicative of said second depth value plane.

4. The method according to claim 1, wherein said determining step comprises the steps of:

modifying said prediction error to get a positive prediction error; and

Golomb-Rice encoding said positive prediction error to get said encoded representation of said prediction error by:

searching for a value k, where k is zero or a positive integer;

providing a number l equal to k if said selected pixel set comprises multiple pixels and otherwise based on w×k+h, where h is a predefined constant and w is a predefined weight;

dividing said positive prediction error by $2^l$ to form a quotient and a remainder; and unary encoding said quotient, wherein said encoded representation of said prediction error comprises a representation of said remainder and said unary encoded quotient, and said compressed representation of said block comprises a representation of k.

5. The method according to claim 1, where said step of providing said prediction comprises calculating said prediction to be equal to two times a depth value of said first neighboring pixel subtracted by a depth value of said second pixel.

6. A method of decompressing a compressed pixel block, said method comprising the steps of:

providing a start depth value based on a start value representation comprised in said compressed pixel block, said start depth value belonging to a first depth value plane;

providing a restart depth value based on a restart value representation comprised in said compressed pixel block, said restart depth value belonging to a second depth value plane;

determining, for at least one pixel of said block, a prediction error based on an encoded error representation associated with said at least one pixel and comprised in said compressed pixel block;

selecting, for said at least one pixel, a pixel set to comprise a first neighboring pixel present in a first prediction direction in said block relative said at least one pixel and a second pixel in said first prediction direction if said first neighboring pixel and said second pixel belong to a same depth value plane as said at least one pixel as determined based on said plane representations;

providing a prediction of a depth value of said at least one pixel based on the at least one depth value of said selected pixel set; and calculating a representation of said depth value of said at least one pixel based on said prediction error and said prediction.

7. The method according to claim 6, where said step of providing said prediction comprises calculating said prediction to be equal to two times a depth value of said first neighboring pixel subtracted by a depth value of said second pixel.

8. The method according to claim 6, further comprising providing, for at least a portion of said multiple pixels, a respective plane representation from said compressed pixel block.

9. The method according to claim 6, wherein said step of selecting said pixel set comprises selecting said pixel set to comprise a second neighboring pixel present in a second prediction direction in said block relative said at least one pixel and a third pixel in said second prediction direction if said second neighboring pixel and said third pixel belong to a same depth value plane as said at least one pixel as determined based on said plane representations but not all of said first neighboring pixel and said second pixel belong to a same depth value plane as said at least one pixel.

10. The method according to claim 9, where said step of providing said prediction comprises calculating said prediction to be equal to two times a depth value of said second neighboring pixel subtracted by a depth value of said third pixel.

11. The method according to claim 9, wherein said step of selecting said pixel set comprises the steps of:

selecting said pixel set to contain one of said first neighboring pixel and said second neighboring pixel if not all of said first, second and a third neighboring pixels belong to a same depth value plane as said at least one pixel, and if not all of said first neighboring pixel and said second pixel belong to a same depth value plane as said at least one pixel, and if not all of said second neighboring pixel and said third pixel belong to a same depth value plane as said at least one pixel but said first and second neighboring pixels belong to a same depth value plane as said at least one pixel as determined based on said plane representations; and providing a guide bit associated with said selected pixel of said first and second neighboring pixels, wherein said compressed representation of said block comprises said guide bit.

12. The method according to claim 9, wherein said step of selecting said pixel set comprises selecting, based on a guide bit assigned to said pixel and comprised in said compressed pixel block, said pixel set to contain one of said first neighboring pixel and said second neighboring pixel if not all of said first, second and a third neighboring pixels belong to a same depth value plane as said at least one pixel, and if not all of said first neighboring pixel and said second pixel belong to a same depth value plane as said at least one pixel, and if not all of said second neighboring pixel and said third pixel belong to a same depth value plane as said at least one pixel but said first and second neighboring pixels belong to a same depth value plane as said at least one pixel as determined based on said plane representations.

13. The method according to claim 12, wherein said step of selecting said pixel set comprises selecting said pixel set to contain said first neighboring pixel if not all of said first, second and third neighboring pixels belong to a same depth value plane as said at least one pixel, and if not all of said first neighboring pixel and said second pixel belong to a same depth value plane as said at least one pixel, and if not all of said second neighboring pixel and said third pixel belong to a same depth value plane as said at least one pixel, and if not said second neighboring pixel belong to a same depth value plane as said at least one pixel but said first neighboring pixel belong to a same depth value plane as said at least one pixel as determined based on said plane representations.

14. The method according to claim 13, wherein said step of selecting said pixel set comprises selecting said pixel set to contain a pixel associated with said start depth value or said restart depth value if not all of said first, second and third neighboring pixels belong to a same depth value plane as said at least one pixel, and if not all of said first neighboring pixel and said second pixel belong to a same depth value plane as said at least one pixel, and if not all of said second neighboring pixel and said third pixel belong to a same depth value plane as said at least one pixel, and if not said first neighboring pixel belong to a same depth value plane as said at least one pixel, and if not said second neighboring pixel belong to a same depth value plane as said at least one pixel as determined based on said plane representations.

15. A block compressing system for compressing a block of multiple pixels each comprising a depth value, said system comprising:

a start selector for selecting a start depth value of the multiple depth values in said block, said start depth value belonging to a first depth value plane;

a restart selector for selecting a restart depth value of said multiple depths values in said block, said restart depth value belonging to a second depth value plane;

a plane representation generator for generating, for at least a portion of said multiple pixels, a respective plane representation indicative of which plane of said first and second depth value planes said at least a portion of said multiple pixels belong to;

a set selector for selecting, for at least one pixel in said block, a pixel set to comprise a first neighboring pixel present in a first prediction direction in said block relative said at least one pixel and a second pixel in said first prediction direction if said first neighboring pixel and said second pixel belong to a same depth value plane as said at least one pixel as determined based on said plane representations;

a prediction provider for providing a prediction of a depth value of said at least one pixel based on the at least one depth value of said selected pixel set;

an error estimator for estimating a prediction error based on said depth value of said at least one pixel and said prediction; and a representation determiner for determining an encoded representation of said prediction error, wherein a compressed representation of said block comprises a representation of said start depth value, a representation of said restart value and said encoded representation of said prediction error.

16. The system according to claim 15, wherein said restart selector comprises:

a value identifier for identifying a depth value of said multiple depth values in said block differing most from said start depth value;

a difference calculator for determining, for at least a portion of said multiple pixels, a respective first difference between a depth value of a pixel and said start depth value and a respective second difference between said depth value of said pixel and said identified depth value; and a value selector for selecting said restart depth value based on said determined first and second differences.

17. The system according to claim 15, wherein said plane representation generator comprises:

a difference determiner for determining a first difference between a depth value of a pixel and said start depth value and determining a second difference between said depth value of said pixel and a depth value of said block differing most from said start depth value; and a representation generator for generating said plane representation to be indicative of said first depth value plane if said first difference is smaller than said second difference and otherwise generating said plane representation to be indicative of said second depth value plane.

18. The system according to claim 15, wherein said representation determiner comprises:

an error modifier for modifying said prediction error to get a positive prediction error; and a Golomb-Rice coder in turn comprising:

a value searcher for searching for a value k, where k is zero or a positive integer;

a number provider for providing a number l equal to k if said selected pixel set comprises multiple pixels and otherwise based on w×k+h, where h is a predefined constant and w is a predefined weight;

a divider for dividing said positive prediction error by $2^l$ to form a quotient and a remainder; and a unary coder for unary encoding said quotient, wherein said encoded representation of said prediction error comprises a representation of said remainder and said unary encoded quotient, and said compressed representation of said block comprises a representation of k.

19. A block decompressing system for decompressing a compressed pixel block, said system comprising:
- a start provider for providing a start depth value based on a start value representation comprised in said compressed pixel block, said start depth value belonging to a first depth value plane;
- a restart provider for providing a restart depth value based on a restart value representation comprised in said compressed pixel block, said restart depth value belonging to a second depth value plane;
- an error determiner for determining, for at least one pixel of said block, a prediction error based on an encoded error representation associated with said at least one pixel and comprised in said compressed pixel block;
- a set selector for selecting, for said at least one pixel, a pixel set to comprise a first neighboring pixel present in a first prediction direction in said block relative said at least one pixel and a second pixel in said first prediction direction if said first neighboring pixel and said second pixel belong to a same depth value plane as said at least one pixel as determined based said plane representations associated with said at least one pixel and said pixel set, a plane representation being indicative of which plane of said first and second depth value planes a pixel belongs to;
- a prediction provider for providing a prediction of a depth value of said at least one pixel based on the at least one depth value of said selected pixel set; and
- a representation calculator for calculating a representation of said depth value of said at least one pixel based on said prediction error and said prediction.

20. The system according to claim 19, further comprising a plane provider for providing, for at least a portion of said multiple pixels, a respective plane representation from said compressed pixel block.

* * * * *